Jan. 22, 1935.  R. W. BROWN  1,989,038
APPARATUS FOR GAUGING AND CONTROLLING THE THICKNESS OF MATERIAL
Filed Sept. 24, 1932   17 Sheets-Sheet 1
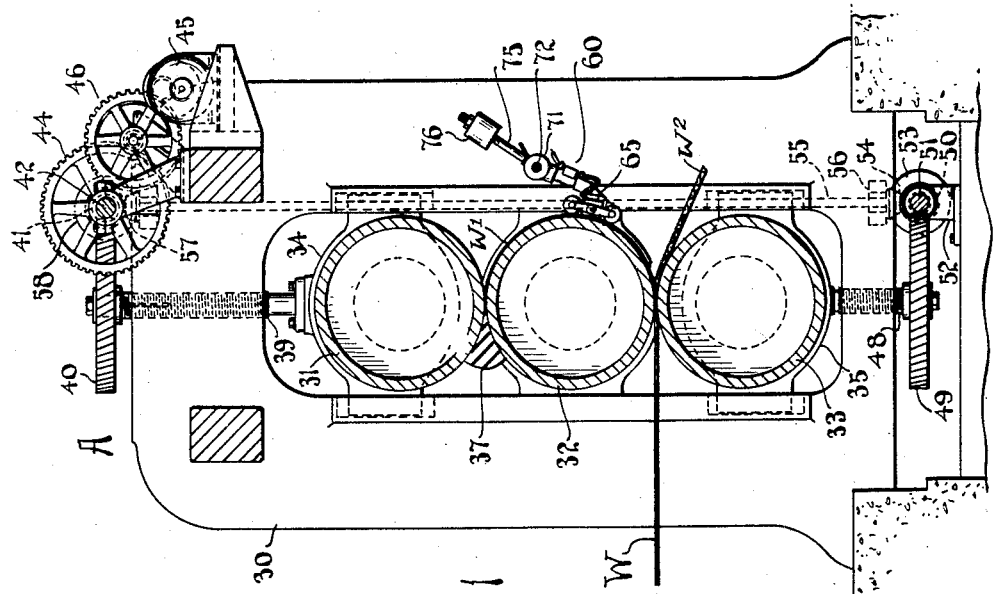
Fig.1
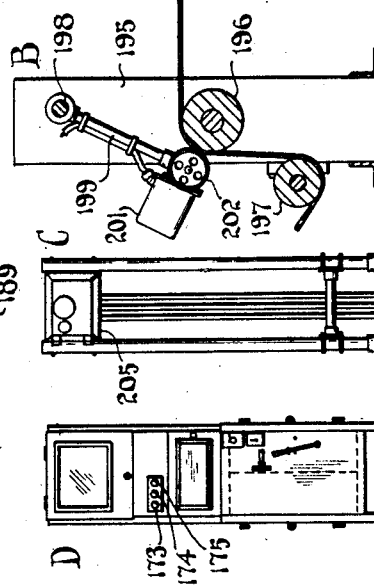
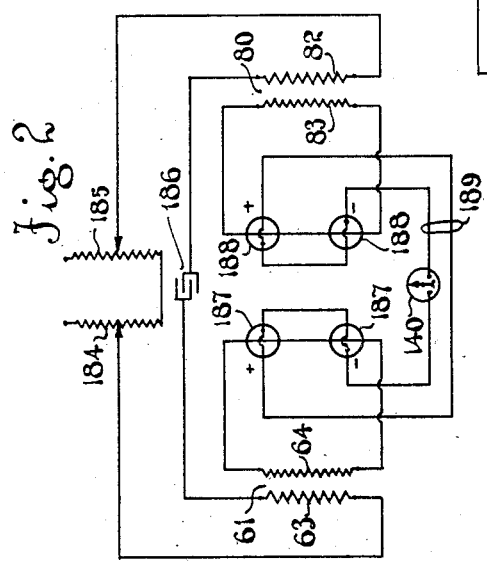
Fig.2
INVENTOR
Roy W. Brown
BY
Ely & Barrow
ATTORNEYS Jan. 22, 1935.  R. W. BROWN  1,989,038
APPARATUS FOR GAUGING AND CONTROLLING THE THICKNESS OF MATERIAL
Filed Sept. 24, 1932  17 Sheets-Sheet 2

INVENTOR
Roy W. Brown
BY Ely & Barrow
ATTORNEYS

Jan. 22, 1935. R. W. BROWN 1,989,038
APPARATUS FOR GAUGING AND CONTROLLING THE THICKNESS OF MATERIAL
Filed Sept. 24, 1932 17 Sheets-Sheet 3

INVENTOR
Roy W. Brown
ATTORNEYS

Jan. 22, 1935.  R. W. BROWN  1,989,038
APPARATUS FOR GAUGING AND CONTROLLING THE THICKNESS OF MATERIAL
Filed Sept. 24, 1932  17 Sheets-Sheet 4
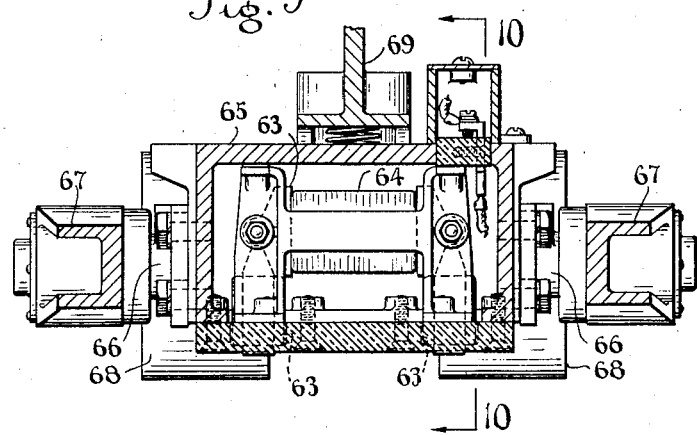
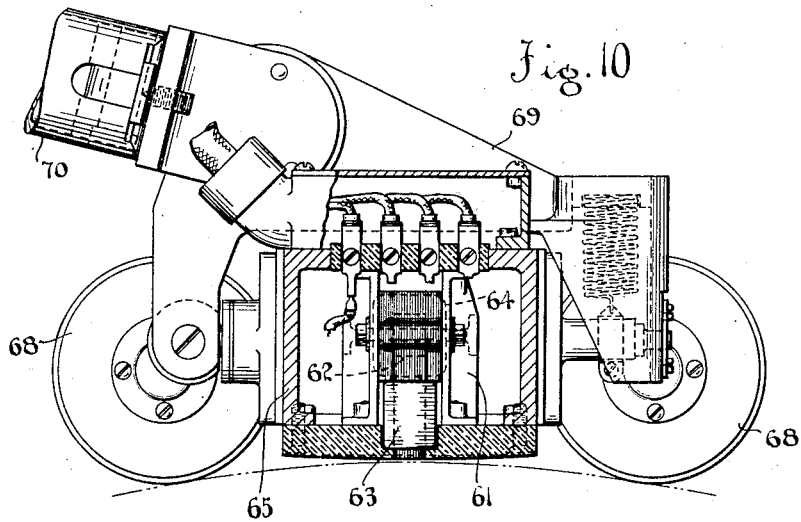
INVENTOR
Roy. W. Brown
BY
Ely & Barrow
ATTORNEYS

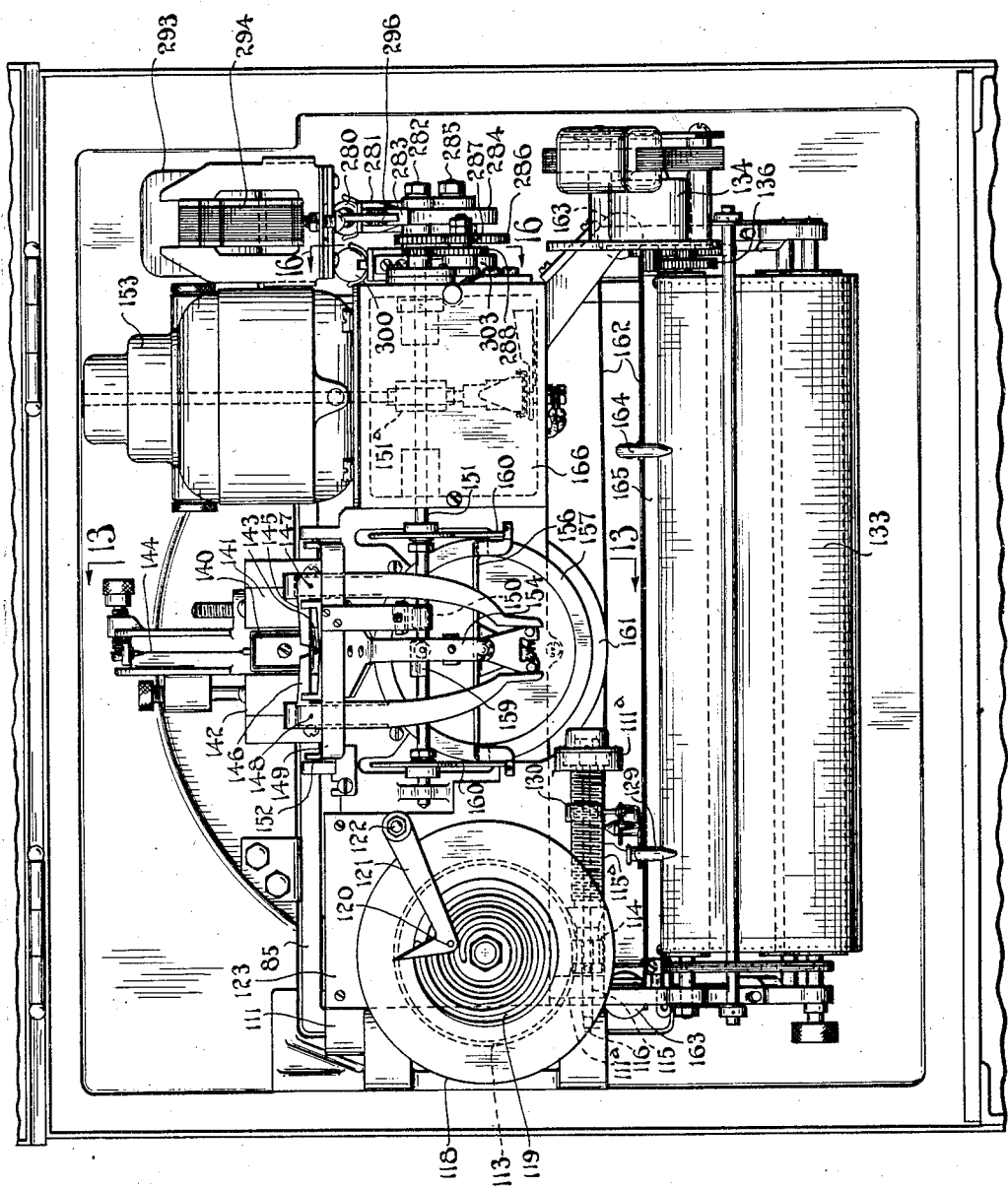

Jan. 22, 1935. R. W. BROWN 1,989,038
APPARATUS FOR GAUGING AND CONTROLLING THE THICKNESS OF MATERIAL
Filed Sept. 24, 1932 17 Sheets-Sheet 6

INVENTOR
Roy W. Brown
Ely & Barrow
ATTORNEYS

INVENTOR
Roy W. Brown
ATTORNEYS

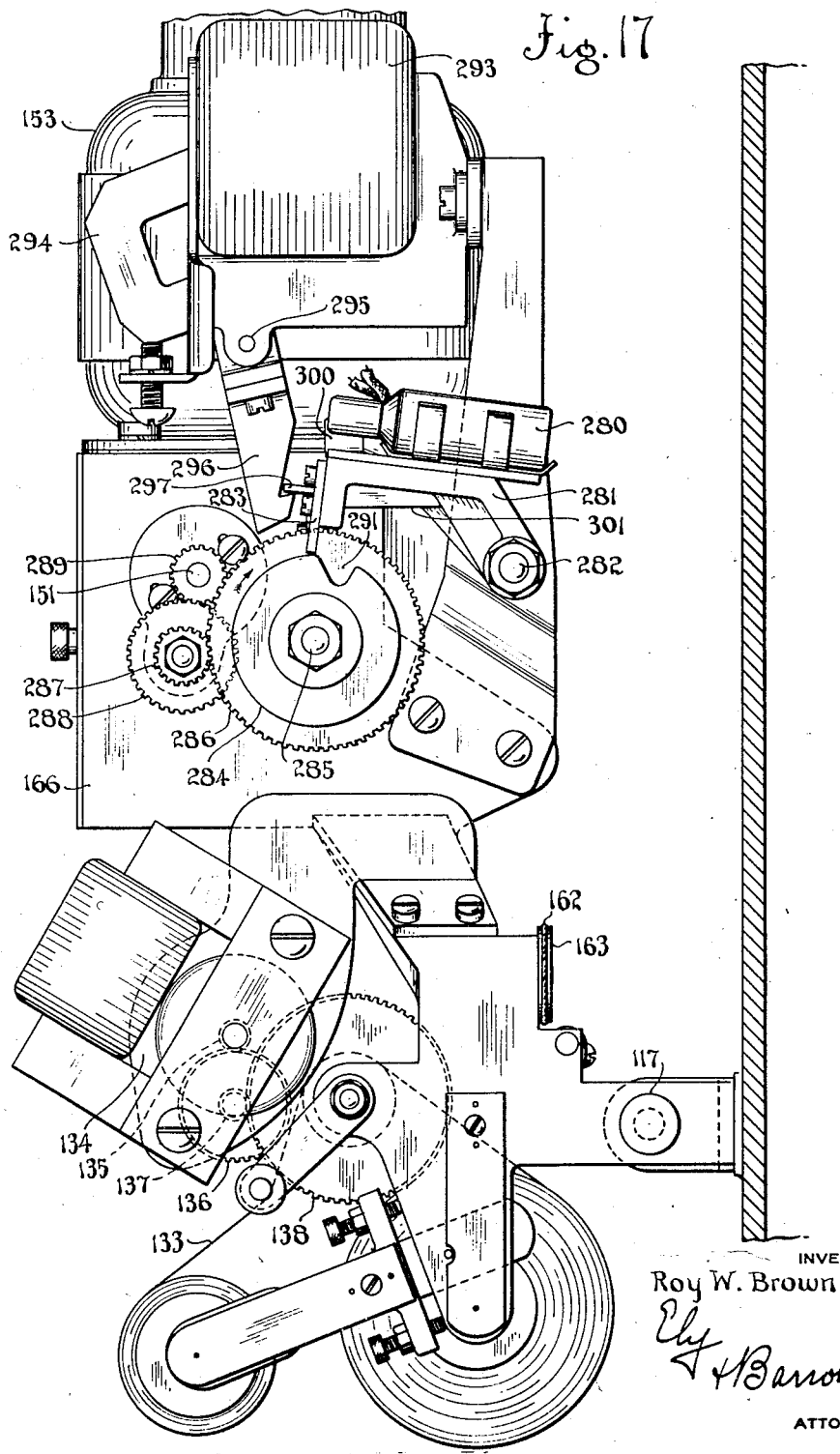

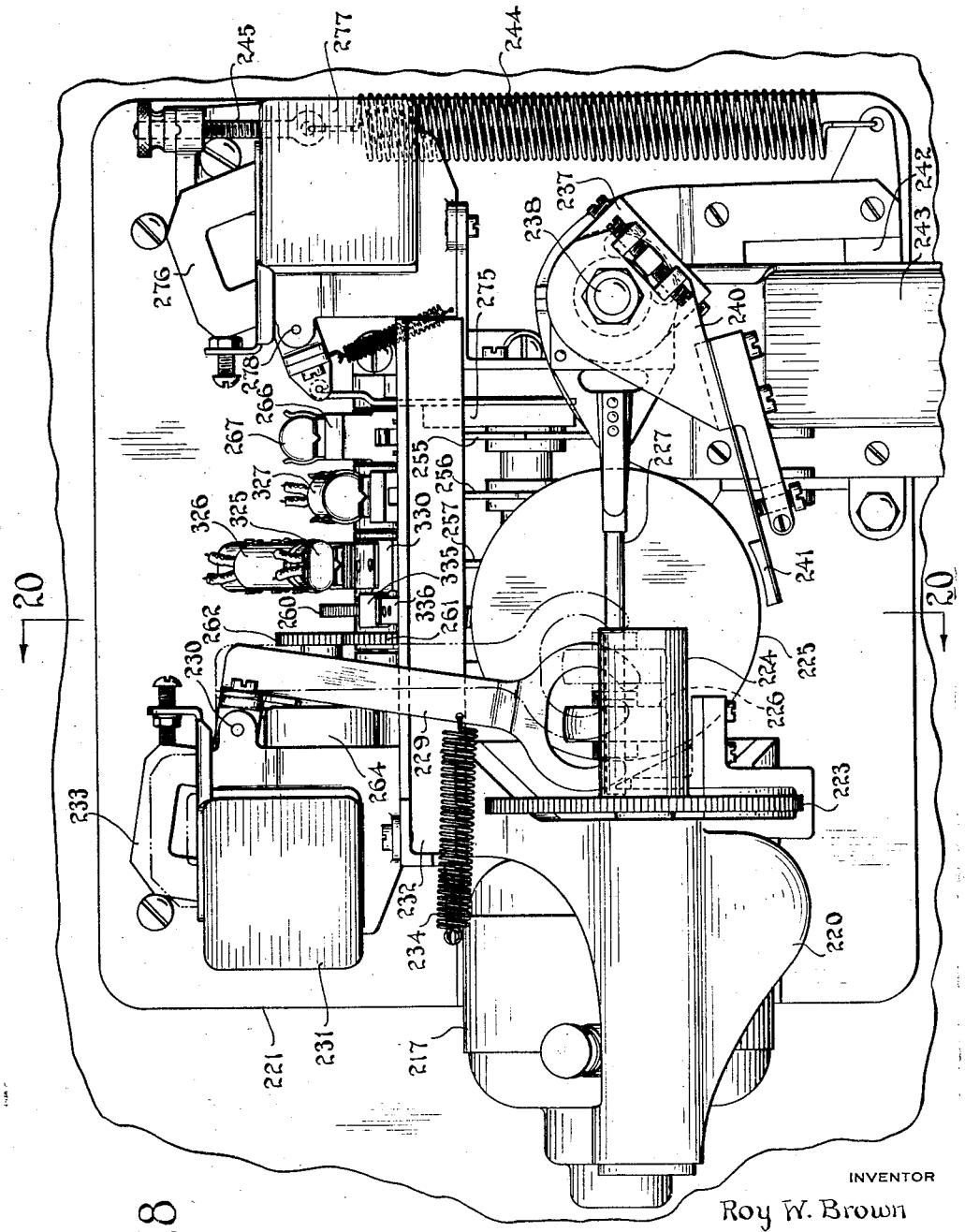

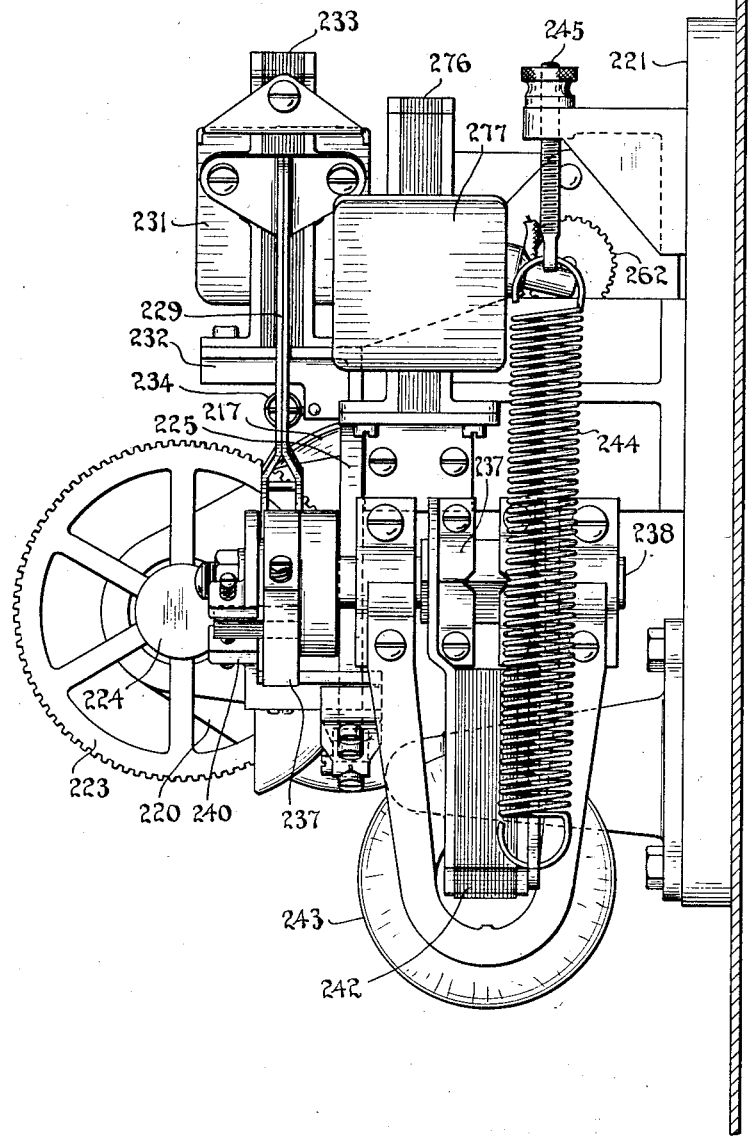

Jan. 22, 1935. R. W. BROWN 1,989,038
APPARATUS FOR GAUGING AND CONTROLLING THE THICKNESS OF MATERIAL
Filed Sept. 24, 1932 17 Sheets-Sheet 13
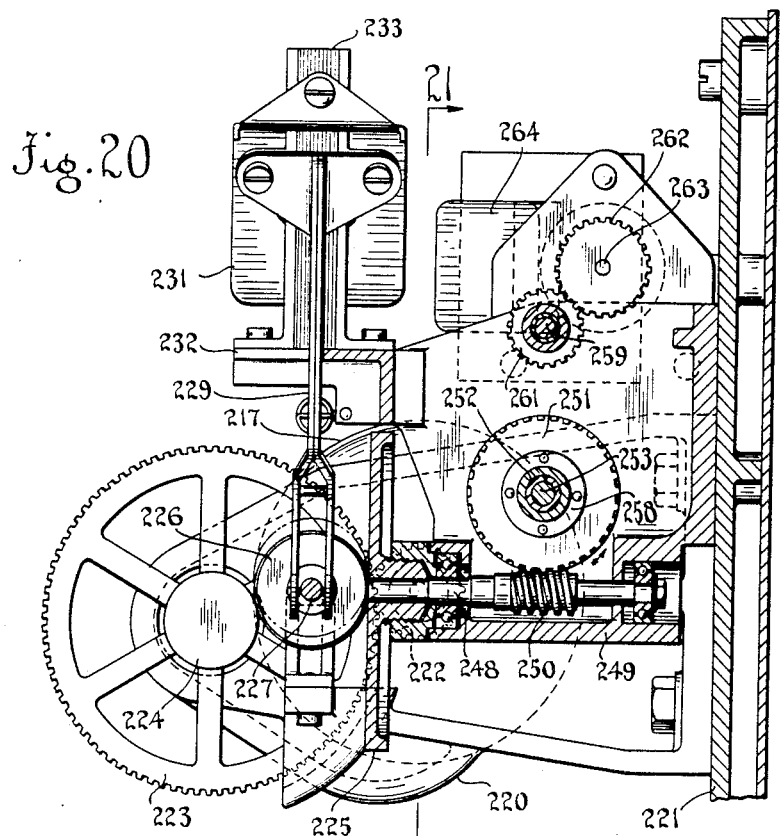
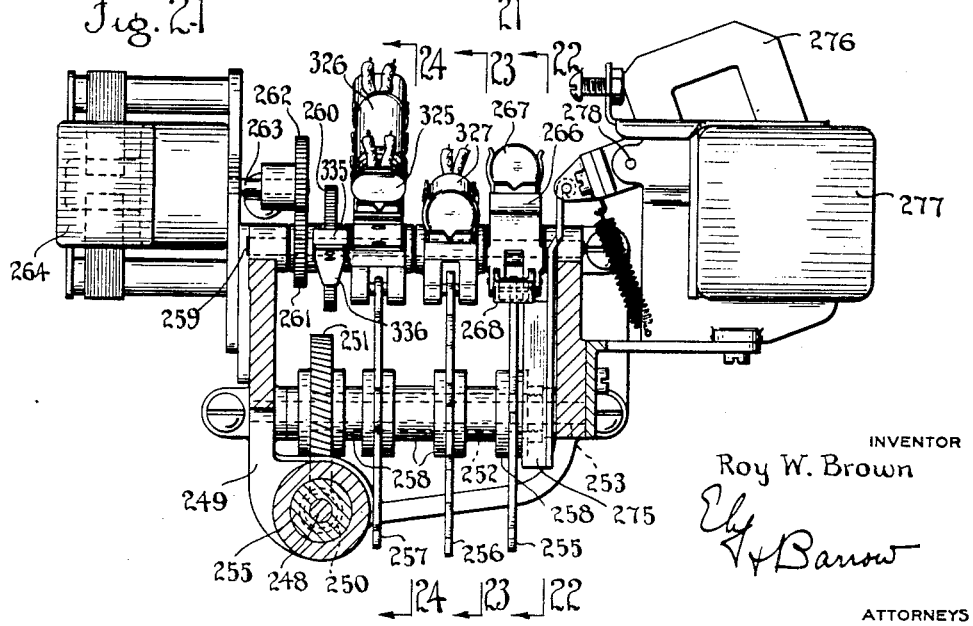
INVENTOR
Roy W. Brown
ATTORNEYS Jan. 22, 1935. R. W. BROWN 1,989,038
APPARATUS FOR GAUGING AND CONTROLLING THE THICKNESS OF MATERIAL
Filed Sept. 24, 1932 17 Sheets-Sheet 14

INVENTOR
Roy W. Brown
BY
ATTORNEYS

Jan. 22, 1935.                R. W. BROWN                 1,989,038
        APPARATUS FOR GAUGING AND CONTROLLING THE THICKNESS OF MATERIAL
                Filed Sept. 24, 1932        17 Sheets-Sheet 16

INVENTOR
Roy W. Brown
BY Ely & Barrow
ATTORNEYS

Jan. 22, 1935.  R. W. BROWN  1,989,038
APPARATUS FOR GAUGING AND CONTROLLING THE THICKNESS OF MATERIAL
Filed Sept. 24, 1932   17 Sheets-Sheet 17
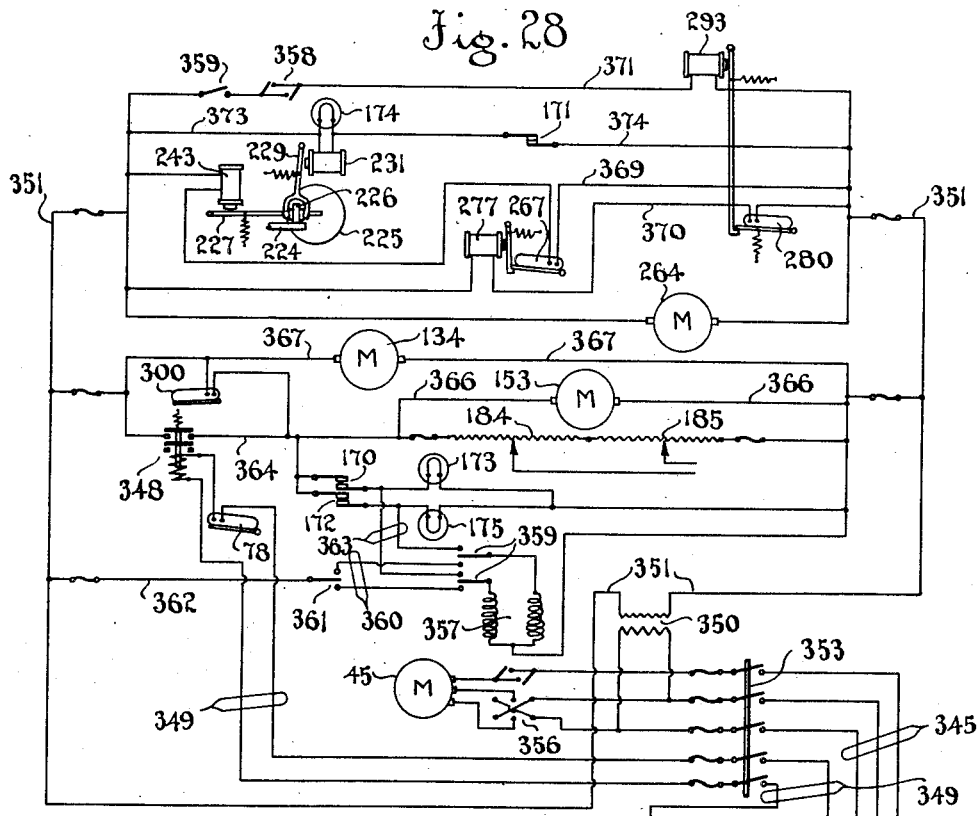
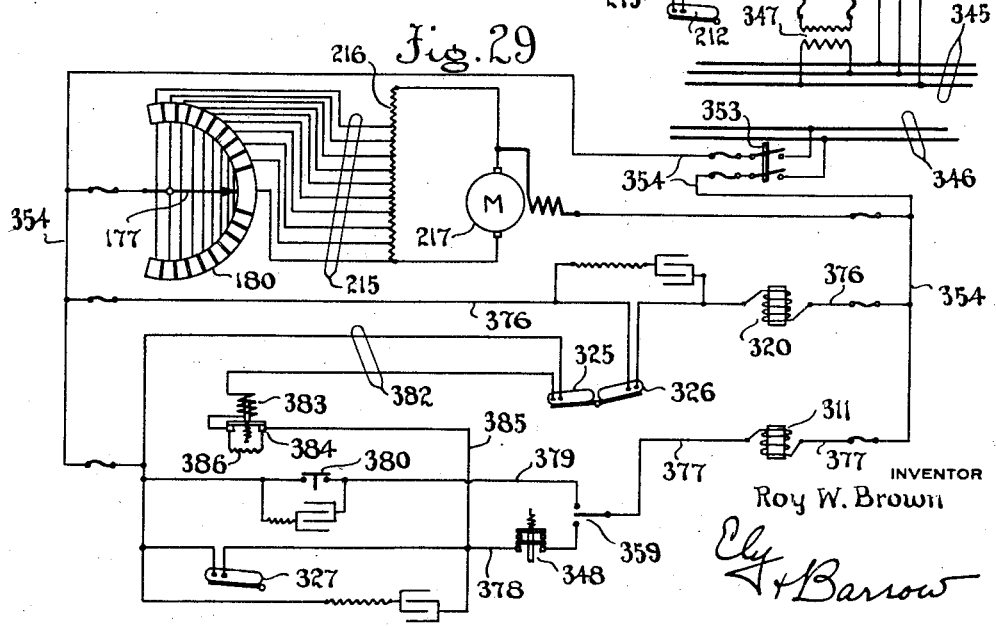
INVENTOR
Roy W. Brown
ATTORNEYS Patented Jan. 22, 1935

1,989,038

UNITED STATES PATENT OFFICE 1,989,038

APPARATUS FOR GAUGING AND CONTROLLING THE THICKNESS OF MATERIAL

Roy W. Brown, Akron, Ohio, assignor to The Firestone Tire & Rubber Company, Akron, Ohio, a corporation of Ohio Application September 24, 1932, Serial No. 634,734

17 Claims. (Cl. 18—2)

This invention relates to apparatus for gauging and controlling the thickness of material, and more especially it relates to mechanism for gauging, recording and automatically controlling the thickness of non-magnetic material, such as rubber, rubberized fabric, paper, and the like, and especially sheet materials of this character, during the manufacture thereof.

The chief objects of the invention are to provide efficient means for maintaining substantially uniform thickness or gauge in continuous sheet material; to provide for quickly and automatically restoring sheet material to proper gauge after it has varied therefrom during the manufacture thereof; and to provide for adjusting the rolls of a calender producing sheet material automatically when said sheet material varies either way from a determinate thickness.

Further objects include the provision of means for compensating for the lost motion or backlash in the gearing that constitutes the calender adjusting mechanism; to provide for intermittent calender adjustments at time intervals that are exact multiples of time intervals at which the sheet material intermittently is gauged; to provide means whereby if calender adjustment is interrupted, adjustment will cease and initial position of adjusting mechanism be restored for successive adjustments after cause of interruption is removed; to provide means whereby all calender adjustments are made during a definite time interval, the extent of adjustment varying according to the variation of material thickness from the desired gauge; to provide for automatically disconnecting the calender control mechanism when the speed of operation of the calender falls below a determinate minimum, or the calender is stopped; to provide for automatic disengagement of the calender control when the gauging mechanism is disengaged; and to provide an improved brake and clutch mechanism for use in calender-roll adjusting apparatus. Other objects will be manifest in the following specification.

Of the accompanying drawings:

Figure 1 is a vertical sectional view of a calender, and gauging, recording, and control mechanism embodying the invention associated therewith;

Figure 2 is a schematic wiring diagram of magnetic measuring mechanism constituting a unit of the calender control apparatus;

Figure 9 is a section on the line 9—9 of Figure 8;

Figure 10 is a section on the line 10—10 of Figure 9;

Figure 11 is a front elevation of gauging, recording, thickness setting, and time-interval control mechanism;

Figure 17 is an end elevation, on a larger scale, of the recording and time-interval control mechanism shown in Figure 11;

Figure 18 is a front elevation of mechanism controlling the clutch and brake of the calender adjusting mechanism;

Figure 19 is an end view thereof;

Figure 20 is a section on the line 20—20 of Figure 18;

Figure 21 is a section on the line 21—21 of Figure 20;

Figures 28 and 29 are diagrams of electrical circuits connecting the various electrical devices of the apparatus.

Figure 3:
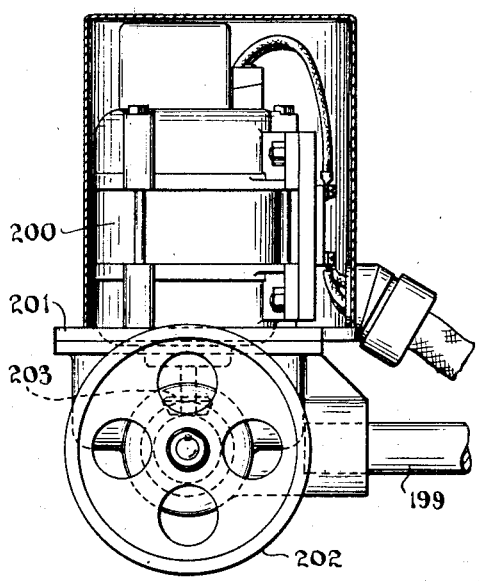
Figure 3 is a detail elevation, on a larger scale, of the generator unit of a Selsyn device, constituting a unit of the calender control apparatus.

Referring to Figure 1 of the drawings, A is a calender unit comprising the usual rolls for sheeting plastic material or for applying plastic material as a coating to sheet material such as fabric, and the work engaging unit of gauging mechanism adapted to engage the sheet material to be gauged on one of said rolls, a unit B spaced from the calender and through which the sheet material from the calender passes, including the generator unit of a Selsyn device in engagement with said sheet material, a unit C consisting of a cabinet that houses the motor unit of the Selsyn device and a centrifugal switch associated therewith, and a unit D comprising a cabinet in the upper part of which is mounted gauging, recording, thickness setting, and time-interval control mechanism, and in the bottom part of which is mounted the mechanism that controls the clutch and brake of the calender adjusting mechanism.

The calender unit A comprises respective end frames 30, 30 and three calender rolls 31, 32, and 33 of which the middle roll 32 is journaled in fixed position and the outside rolls 31, 33 are journaled in bearing blocks 34, 35 respectively that are slidable in the end frames for permitting adjustment of the rolls 31, 33 from and toward the middle roll 32. The sheet material is shown herein as a sheet of plastic, non-magnetic material $W^1$ such as unvulcanized rubber composition that is formed from a bank of material 37 between rolls 31, 32, said sheet passing around one side of the roll 32 under the work engaging unit of the gauging mechanism and then between roll 32 and roll 33, where it is skim-coated onto or pressed into a sheet of fabric $W^2$. The combined rubberized fabric material or work W then passes to the unit B.

For raising and lowering the upper calender roll 31, the bearing blocks 34 thereof are connected to the lower ends of respective screws 39 that are threaded through the tops of the respective end frames 30, the upper end of each of said screws being provided with a worm gear 40. The worm gears 40 are meshed with respective worms 41, 41 that are mounted upon the end portions of a horizontal shaft 42 that is journaled adjacent its respective ends in bearing brackets 43, 43, (Figure 25) that are mounted upon the tops of the calender end frames 30. Intermediate the bearing brackets 43 the shaft 42 is provided with a gear 44 that is driven, upon occasion, by a reversible motor 45 through the agency of a novel brake and clutch mechanism, generally designated 46, the details of which subsequently will be described.

For raising and lowering the lower calender roll 33, the bearing blocks 35 thereof are connected to the upper ends of respective screws 48 that are threaded through the bottoms of the respective end frames 30, the lower ends of each of said screws 48 being provided with a worm gear 49. The worm gears 49 are meshed with respective worms 50, 50 that are mounted upon the end portions of a horizontal shaft 51 that is mounted beneath the calender in bearing brackets 52. The respective ends of shaft 51 are provided with bevel gears 53 that are meshed with respective bevel pinions 54 on the lower ends of respective vertical shafts 55, 55 that are journaled in brackets 56 of the outer sides of the calender end frames 30 and have their upper ends provided with respective bevel pinions 57 that are meshed with bevel gears 58 that are mounted upon the respective ends of shaft 42.

The arrangement is such that calender rolls 31, 33 are adjustable concurrently from and toward the middle roll 32 at exactly the same rate, the corresponding adjustment gearing for the two rolls being identical.

Adjustment of the calender rolls is automatically effected, by mechanism presently to be described, whenever the thickness of the work W varies more than .0005" over or under a determinate standard, the adjustment restoring the thickness of the work to said standard. Because of the relatively small movement of the calender rolls necessary to effect an adjustment, there will be relatively slight axial movement of the screws 39, 48, and worm gears 40, 49, there being enough play or lost motion between gears 40, 41 and between gears 49, 50 to permit the necessary slight axial movement of the gears 40, 49.

The gauging of the material W is effected by the forming of a magnetic gap in the core of a transformer by means of the material to be gauged, and the measuring of said gap by means of a second transformer having an armature adapted to adjust itself to maintain a magnetic gap in its own core of the same width as that maintained by the material in the first transformer core. Mechanical means controlling the movement of the armature of the second transformer also are connected to indicating and recording instruments which show the thickness and variations of the material being gauged. Means also is provided for automatically opening and/or closing the electrical circuit of the gauging mechanism accordingly as the lineal speed of the work exceeds or falls below a determinate minimum speed.

Mechanism for gauging the work W comprises a gauging unit 60 that engages the surface of the work that lies upon the calender roll 32. As shown in Figures 7 to 10 inclusive, the gauging unit 60 includes an open core transformer 61 having a transformer core 62 about which is wound a primary coil 63 and a secondary coil 64. The transformer 61 preferably is carried slightly spaced from the surface of the material W by means of a rolling carriage including a non-magnetizable box 65 to the sides of which are fixed stub axles 66, 66 journaling respective wheel arms 67 which rotatably carry wheels 68, 68, at their respective ends.

The box 65 containing the transformer 61 is pivotally supported on a U-shaped bracket 69 that is mounted for universal adjustability upon one end of a hollow arm 70, the other end of the latter being carried by a hub 71 that is supported by a shaft 72. The shaft 72 is disposed parallel to the roll 32, somewhat above the axis thereof, and is supported at its respective ends upon the calender end frames 30. The hub 71 includes a split locking ring 73 that is feathered on the shaft 72 and is provided with a hand clamp 74 by which the said ring, and the hub 71, may be locked in desired position longitudinally of the shaft 72.

Extending from the hub 71, substantially diametrically opposite the arm 70, is a rod 75 that carries a counterweight 76. The latter is adjusted on the rod 75 so that in the operative position of the unit 60 the carriage wheels 68 will be held lightly but firmly against the material W on the calender roll 32, as is shown in full lines in Figure 7. In the inoperative position of the unit 60 the counterweight will be over center with relation to shaft 72 so as to hold the carriage 65 away from the work as is indicated in broken lines in Figure 7.

The moving of the gauging unit 60 into operative or inoperative position is effected manually. A mercury switch 78 is so positioned in the hollow arm 70 as to be closed in the operative position of the unit and open in the inoperative position of the unit. The switch 78 is so arranged in the electrical system of the apparatus as to disconnect the calender adjusting mechanism and the gauging mechanism when the unit 60 is in inoperative position.

The wheels, carriage arms, and other parts of the gauge unit supporting means which would change the distance between the surface of the work and the gauge unit due to temperature changes are made of invar of other material not affected by changes of temperature.

The provision of a four-point pivotal support for the gauge unit causes less movement of the latter from lumps or other irregularities in the material W so that the gauge will read closer to the actual thickness of said material.

Figure 12:
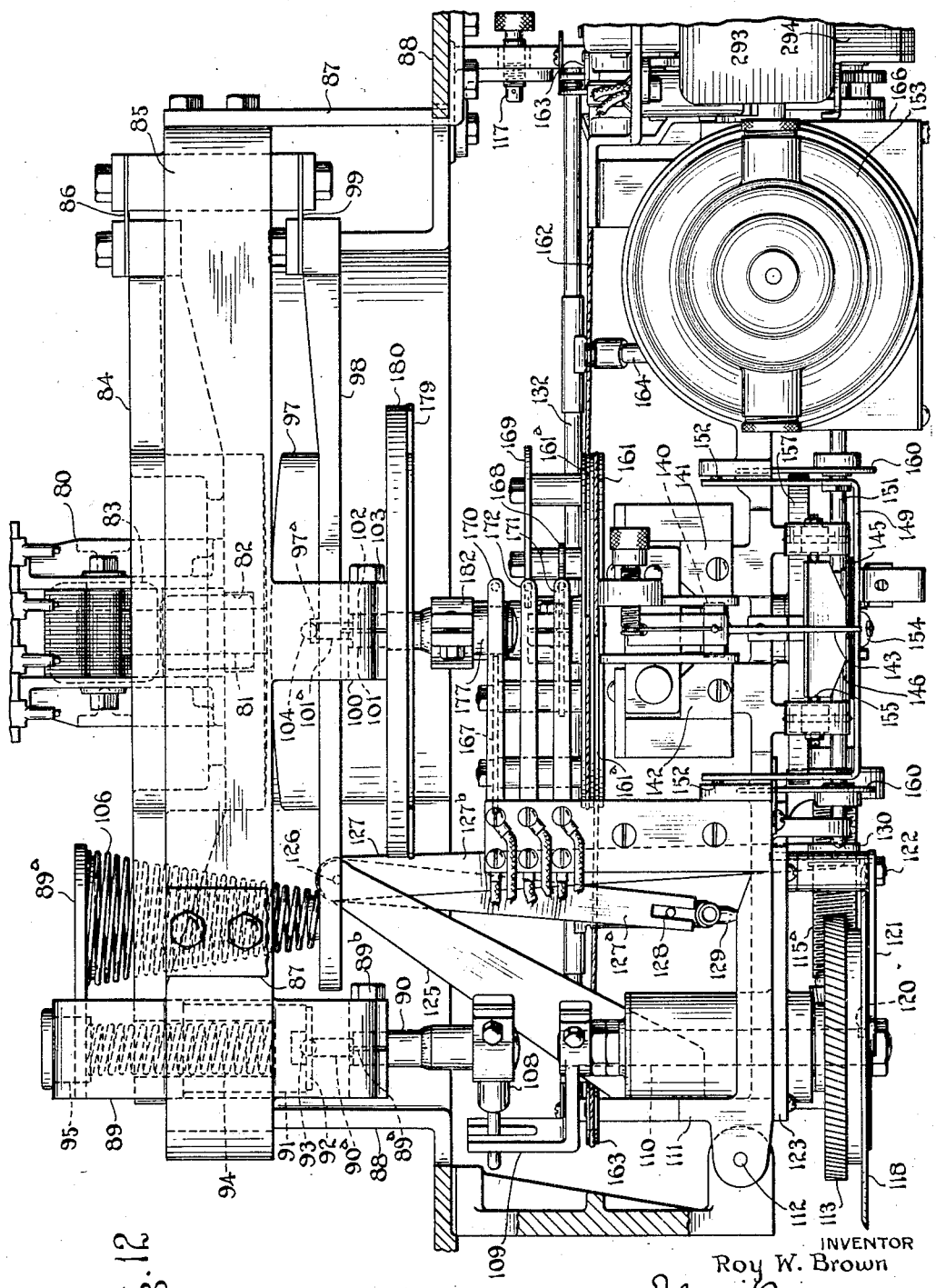
Figure 12 is a plan view of the mechanism shown in Figure 11, on a larger scale, parts being broken away and in section, the housing cabinet being omitted.
Figure 13:
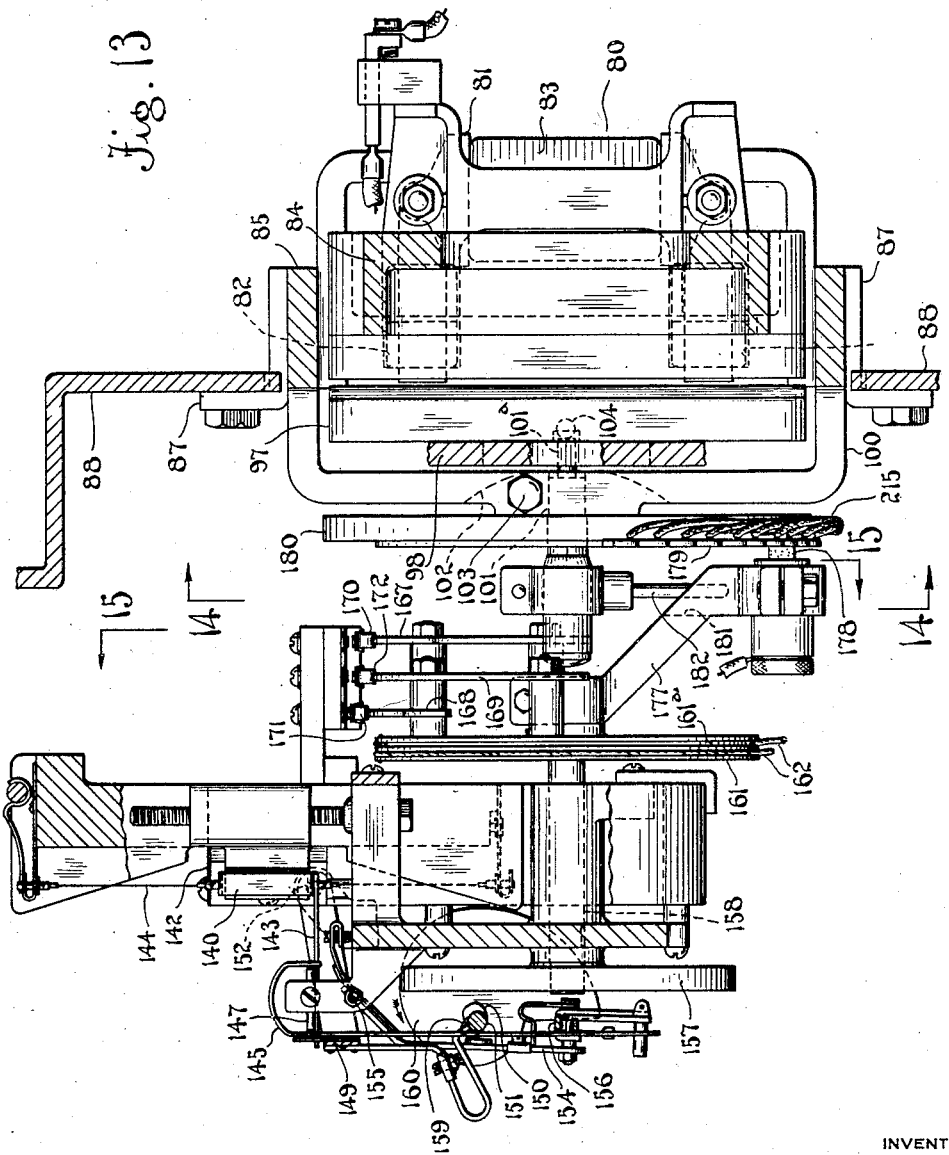
Figure 13 is a section on the line 13—13 of Figure 11.

The second or balancing transformer designated generally 80 is mounted in the recording and indicating instrument shown in elevation in Figure 11, which instrument is housed in the upper part of the cabinet constituting unit D. The transformer 80, which is best shown in Figures 12 and 13, comprises a core 81, primary winding 82, and secondary winding 83, which parts are identical with those of the transformer 61 carried by the gauging unit 60. The transformer 80 is mounted upon a member 84 that is pivotally supported at one end on an O-shaped frame 85 through the agency of flexible hinge plates 86. The frame 85 is fastened by brackets 87, 87 to a flange 88 of the instrument cabinet. An Q-shaped bracket 89 transversely fastened to the frame 85 supports a micrometer screw 90, Figure 12. The bracket 89 is slotted at 89ª to permit a screw 89ᵇ to clamp the bracket 89 about the casing of the micrometer screw. The free end portion of the member 84 is tapped to receive an elongate socket 91 which in turn carries a ball-cup 92 serving to retain a ball 93 between the end of micrometer shaft 90ª and the socket 91. A compression spring 94 received at one end in the socket 91 and at the other in a cup 95 in the bracket 89 serves yieldingly to hold the member 84 against the micrometer shaft 90ª.

The magnetic core of the transformer 80 is partly and variably completed by an armature 97 mounted upon a Y-shaped member 98 that is pivotally supported on the front of the frame 85 by flexible hinge plates 99, 99. A U-shaped bracket 100 formed on the frame 85 supports a micrometer screw 101, the bracket being bored to receive the casing of the micrometer screw, and a slot 102 being formed in each side of said bore so that a set-screw 103 through said slot will clamp the micrometer screw casing in place. The armature 97 is recessed at 97ª to receive a ball 104 which engages the end of the shaft 101ª of the micrometer 101.

A compression spring 106, Figure 12, is mounted between the free end of the member 98 and a lateral extension 89ª of the bracket 89 so as yieldingly to hold the armature 97 against the micrometer shaft 101ª and to keep the said armature as far as possible from the core 81 of the transformer 80.

The micrometer screw 90, controlling the position of the member 84 and thus the position of the transformer 80, is provided with means for manual setting. Such means may include a finger 108 fixed to an end of the micrometer screw 90, which finger is engaged by a fork 109 carried on the inner end of a shaft 110 that is journaled in an instrument-carrying frame 111 that is pivotally supported at 112 by the instrument cabinet. A spiral gear 113 keyed to the shaft 110 meshes with a spiral pinion 114, Figure 11, carried on a shaft 115 journaled in brackets 111ª of the frame 111. The end of the shaft 115 may be extended as at 116 and squared to receive a key (not shown) whereby the shaft may be rotated to control the initial position of the transformer 80. The free end of the swinging frame 111 is provided with means comprising a thumbscrew 117 for connecting it to flange 88 of the instrument cabinet.

Also mounted upon the shaft 110 is a dial 118 for visibly indicating the position of the micrometer screw 90, and said dial also may be used for manually rotating the shaft 110 if desired. The central portion of the front face of the dial 118 is formed with a spiral groove 119 in which is received a stud 120 projecting rearwardly from an angular indicating finger 121, the latter being pivotally mounted at 122 upon a post carried by plate 123 on the frame 111. Radially outwardly of the spiral groove 119 the dial 118 is provided with a spiral series of indicia (not shown) with which the end of the indicating finger 121 will register so as visibly to indicate the setting of the micrometer 90 and thus to show the thickness of the material W.

A bracket 125 secured to the frame 111 pivotally supports at 126 a bell crank 127, one arm 127ª of which is forked to slidably engage with a stud 128 projecting from the top of a recording pen 129. The other arm 127ᵇ of the bell crank 127 is extended beneath the shaft 115, which at this point is provided with a threaded portion 115ª, and a nut 130 is mounted upon said threaded portion and provided with a projecting stud that is engaged by the free end of the bell crank arm 127ᵇ. Thus the turning of the shaft 115, by the key or by means of the dial 118, not only adjusts the initial position of the transformer 80 and indicates the position thereof on the dial 118, but also changes the position of the recording pen 129.

The recording pen 129 is slidably carried on a guide rod 132, Figure 12, so that it engages with a continuous chart 133, Figures 11 and 17, driven constantly at a uniform rate of speed by an electric clock motor 134 through suitable gearing 135, 136, 137 and 138, so that a permanent record may be made.

The micrometer screw 101 that controls the position of the armature 97 is operated by a balancing galvanometer of a known type, such as that shown in the patent of Brewer, No. 1,356,804, issued October 26, 1920. The construction will be briefly described, reference being directed to the said patent for details. Referring particularly to Figures 11, 12 and 13, a galvanometer coil 140 is mounted between poles 141, 142 of a magnet and carries a pointer 143. The movements of the galvanometer coil 140, which swings upon a vertical axis 144, are controlled by the electrical conditions which are present from time to time in the measuring circuit of the recording mechanism. When the galvanometer system is at its position of rest (i. e., the measuring circuit is balanced), the galvanometer pointer 143 is disposed directly under a space between the free ends of the horizontal arms of two right-angle levers 145, 146, which are pivotally mounted at their elbows at 147, 148.

From this position of rest the galvanometer system may deflect under the influence of current in the galvanometer, until its pointer lies at any position between suitable stops at opposite sides of the center of a rocker arm 149.

By means of a cam 150 on a motor-driven shaft 151, the rocker arm 149, which is pivotally mounted at 152, 152, is periodically lifted, and as it is lifted it picks up the end of the galvanometer pointer 143 and lifts it. If at that instant the galvanometer is balanced, the pointer is moved into the space between the ends of the levers 145, 146. If, however, as the rocker arm is lifted the galvanometer is unbalanced so that its pointer lies under one or the other of the horizontal arms of the levers 145, 146, the pointer as it rises will carry upwardly with it one of said lever-arms. The shaft 151 is driven through reduction gearing 151$^a$, Figure 11, from a motor 153 that is mounted upon the frame 111. The reduction gearing 151$^a$ is housed in a governor box 166 also mounted upon the frame 111.

A depending arm 154 that is pivotally mounted at its upper end at 155, Figure 13, carries one member 156 of a clutch mechanism pivotally mounted at its lower end, the other member of the clutch consisting of a disc 157 that is carried upon the outer end of a shaft 158. The arm 154 is engaged by a cam 159 mounted upon the driven shaft 151. Cams 160, 160 are mounted upon the shaft 151 in position to engage the respective end portions of the clutch member 156 when it is positioned at any angle to horizontal position. The arrangement is such that when the cam 150 is lifting the rocker arm 149 to effect a periodic gauging operation, the cam 159 is moving the arm 154 so as to disengage the clutch members 156, 157, with the result that if the galvanometer is unbalanced and the pointer 143 is to one side of neutral position, the rising rocker arm 149 will cause such movement of one of the lever arms 145 or 146 as to cause the other end of the lever arm to move the clutch member 156 angularly one way or the other out of horizontal position.

As soon as the aforesaid operation is effected, the cam 159 permits the arm 154 to return to normal position in which the clutch member 156 operatively engages clutch member 157, and then one of the cams 160 engages that end of the clutch member 156 that is elevated and moves said clutch member back to horizontal position, thereby rotating clutch disc 157 and the shaft 158 upon which it is mounted.

The amount of rotation imparted to clutch members 156, 157 depends upon the extent of the galvanometer deflection, since the pointer approaches the fulcrums of the levers 145, 146 as the deflection increases. Consequently the rebalancing movement will be large or small as the unbalance is large or small.

The shaft 158 upon which the clutch disc 157 is mounted extends through and is journaled in the frame 111, and on its rear end portion carries a pulley 161 formed with peripheral grooves 161$^a$. A flexible cord 162 wound about the pulley 161 passes over a pair of sheaves 163, 163, Figures 11, 12, journaled at opposite ends of the frame 111, the ends of the cord being attached to a second recording pen 164 that is slidably carried on the guide rod 132 and cooperates with the moving chart 133 to make a permanent record of the actual thickness of the material. A suitably graduated scale 165 may be mounted along the top of the chart 133, behind the pens 129, 164, to facilitate reading of the chart.

Mounted upon the rear face of the pulley 161, and spaced from the latter and from each other, are three arcuate cam plates 167, 168, and 169 respectively, that are positioned to engage respective electrical switches 170, 171, and 172 mounted upon the frame 111 alternatively as the pulley moves angularly when the material W is over or under gauge, or as it is in normal stationary position when the material is within the limits of correct gauge.

The said switches control visible indicating means such as red, white, and blue lights 173, 174, 175 respectively, (see Figures 1 and 28) and thus indicate the condition of thickness of the material W. The central cam plate 168 slightly overlaps the cam plates 167, 169 at each of its ends. Thus, upon occasion, the white light and a red or a blue light may show concurrently. This indicates that the thickness of the material W is but one half of one one-thousandth of an inch off gauge.

Figure 14:
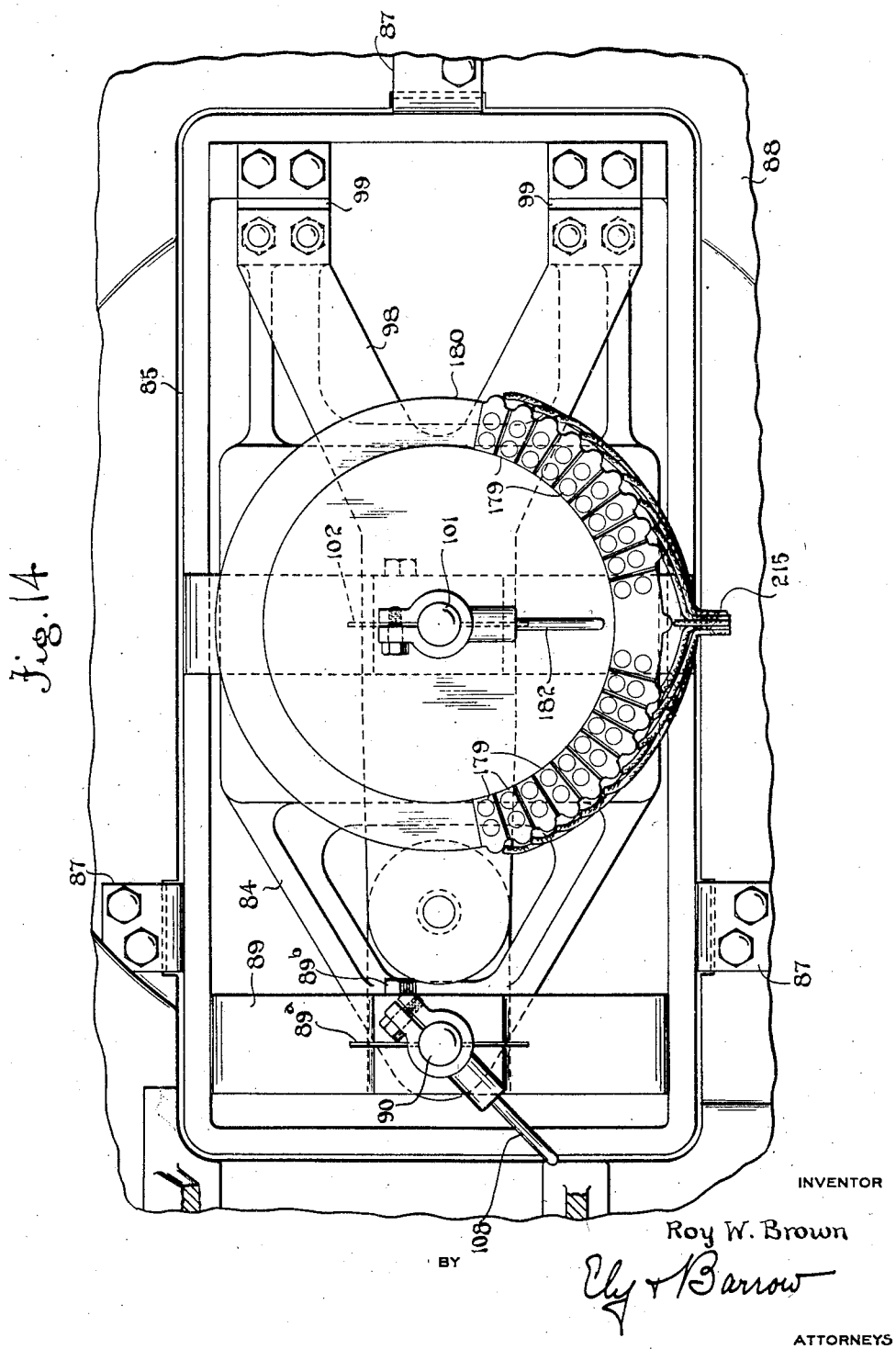
Figure 14 is a section on the line 14—14 of Figure 13.
Figure 15:
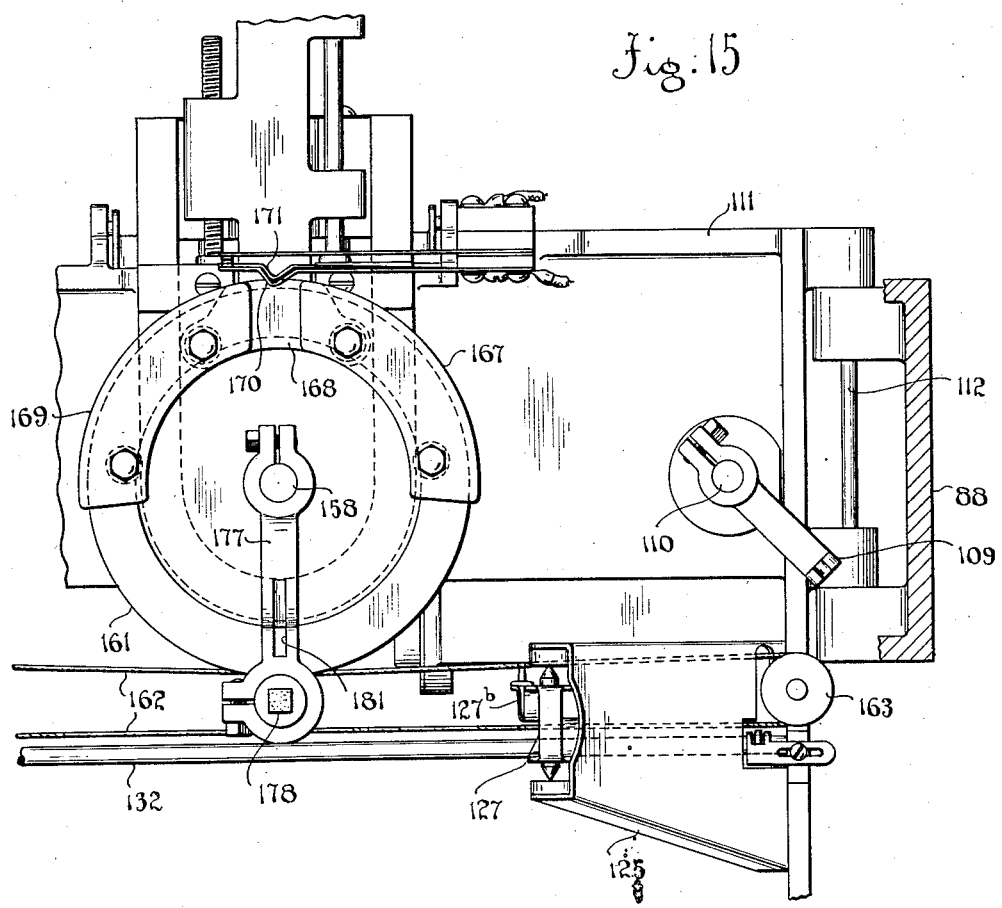
Figure 15 is a section on the line 15—15 of Figure 13.

Upon the rear end of the shaft 158 is mounted an angular arm 177, the free end of which carries a commutator brush 178 that is movable over an arcuate series of electrical contact terminals 179, 179, Figure 14, of a commutator 180, the latter being non-rotatably mounted upon the fixedly-mounted micrometer 101. The commutator arm 177 is slotted at 181, see Figure 15, to receive a finger 182 that is mounted upon the rotatable screw of the micrometer 101, so that when the shaft 158 is turned by the balancing galvanometer as hereinbefore described, the micrometer screw will be turned to move the armature 97 of the transformer 80 toward or away from the core 81 thereof until the galvanometer circuit is balanced.

Since the gauging, recording, and balancing mechanism just described operates substantially independently of the calender control mechanism subsequently to be described, a description of the electrical circuit of the balancing mechanism now may be given. The schematic wiring diagram of Figure 2 shows the manner in which the various instruments are connected.

The primaries of the transformers 61 and 80 are connected in series with each other, and with a suitable source of alternating current as through the rheostats 184, 185. A condenser 186 is interposed in this circuit between said primaries to increase the galvanometer sensitivity, the condenser being calibrated to give maximum sensitivity for the range of thicknesses of rubber stocks operated upon. The secondaries of the transformers are connected in series to the heater wires of pairs of conventional vacuum thermocouples 187, 187 and 188, 188.

While two thermocouples are shown, it will be understood that one or more thermocouples may be used according to the sensitivity desired. Fluctuations of the current flowing through each transformer secondary thus will cause fluctuations in the temperature of the hot junctions of the thermocouple and thus cause changes in the E. M. F. generated thereby. The junction circuits of the thermocouples are connected in series in bridge circuit 189 and with the galvanometer coil 140. The thermocouples are balanced against each other, as by means of the rheostats 184, 185, so that there will be no current flow in bridge circuit 189 when the secondary circuits are balanced. However, when there is an unbalanced condition current will flow in the bridge circuit 189 and actuate galvanometer coil 140. The circuit just described, and mechanism controlled thereby, is inoperative during intervals when the material W is moving slower than a determinate minimum speed, or is motionless, or if unit 60 is off roll, this result being accomplished by means of a Selsyn device now to be described.

Referring again to Figure 1 of the drawings, the unit B, which is spaced a short distance from the delivery side of the calender unit A, comprises a pair of upright supports, such as the support 195, in which supports a pair of idler rollers 196, 197 are journaled. The material W from the calender is drawn over the roller 196 and under roller 197, and then is drawn onto a suitable reel (not shown). Pivotally mounted upon a bar 198 that connects the supports 195, above the roller 196 is the generator unit of a Selsyn device, said unit including a depending arm 199 which permits the unit to ride upon the material W where the latter passes around the roller 196. As is most clearly shown in Figure 3 the Selsyn generator unit comprises an electrical generator 200 that is housed in a suitable receptacle 201 on the free end of the arm 199, said receptacle including a pair of wheels, such as the wheel 202, that ride upon the material W. Suitable gearing 203 is interposed between the axle of the wheels 202 and the shaft of the generator 200 for driving the said shaft when the material W is moving.

Figure 4:
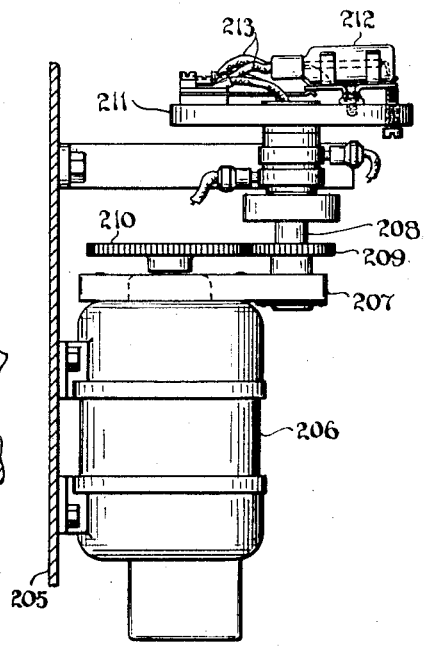
Figure 4 is a detail elevation, on a larger scale, of the motor unit of the Selsyn device, including a centrifugal switch.
Figure 6:
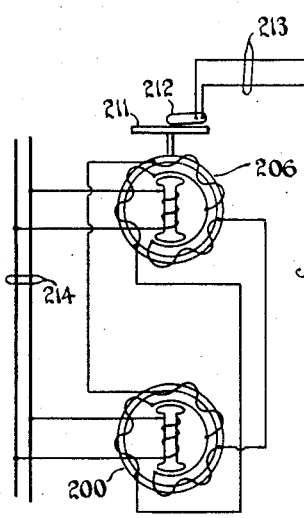
Figure 6 is a wiring diagram of the Selsyn device and centrifugal switch.
Figure 5:
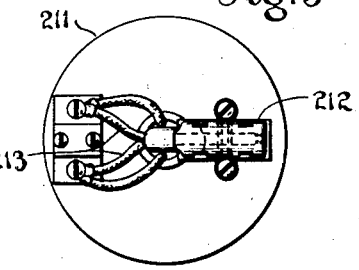
Figure 5 is a plan view of the centrifugal switch shown in Figure 4.
Figure 7:
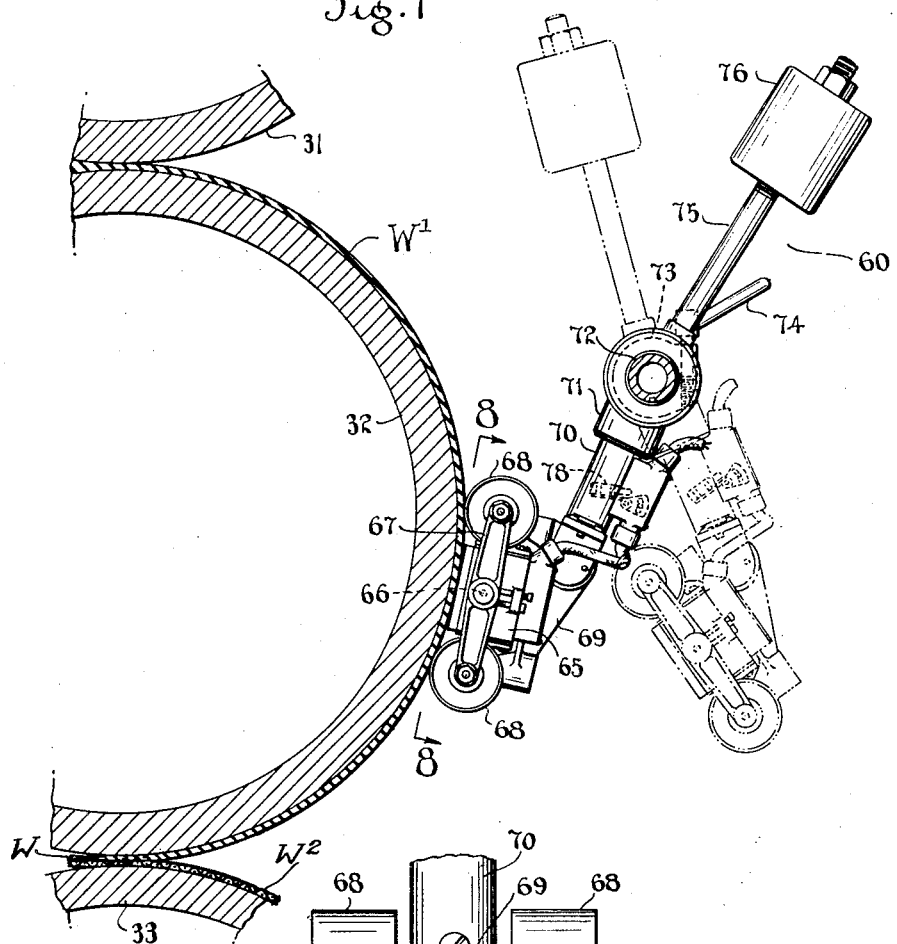
Figure 7 is a side elevation of the work-engaging unit of the work-gauging mechanism of the apparatus, and the work engaged thereby.
Figure 8:
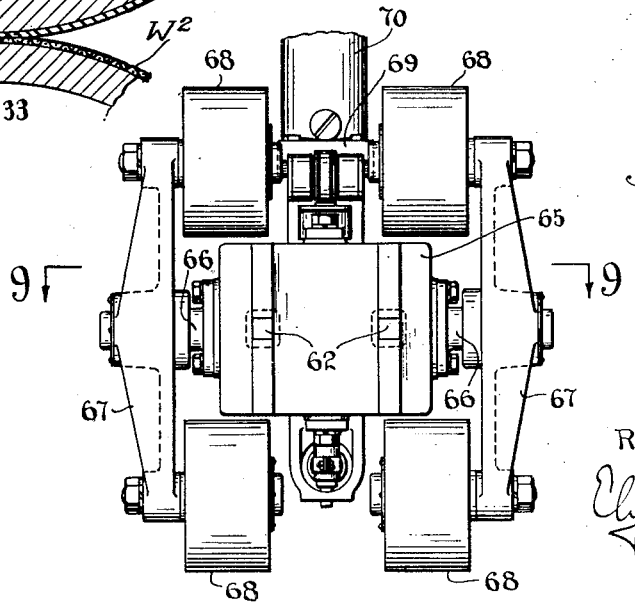
Figure 8 is a view taken on the line 8—8 of Figure 7.

The motor unit of the Selsyn device, as herein shown, is mounted in the cabinet, designated 205, of unit C. As is best shown in Figure 4, the motor 206 is mounted upon a vertical axis upon the wall of the cabinet 205, and upon its upper end-frame carries a bracket 207 in which is journaled a vertical countershaft 208, the latter carrying a gear 209 that is meshed with a gear 210 on the shaft of the motor. The upper end of the countershaft 208 carries a disc 211 that has a mercury switch 212 mounted in radial position thereon at one side of the axis of the disc. A pair of electrical conductor wires 213 from the switch 212 are a part of a 110 volt A. C. circuit subsequently to be described, which circuit supplies power to the galvanometer circuit shown in Figure 2. A conventional wiring diagram of the Selsyn device is shown in Figure 6, current being supplied to the device through connections 214 from any convenient source (not shown). The arrangement is such that the generator 200 and motor 206 always are in synchronism, so that the disc 211 rotates at a speed controlled by the speed of feed of the material W. When the angular speed of the disc 211 is not sufficient to cause centrifugal force to throw the mercury in switch 212 to the outer extremity thereof, electrical contact between conductors 213 is broken and the line is open.

The duration or interval of calender adjustment is in direct relation to the extent of departure of the material thickness from the correct or desired gauge. This result is accomplished partly through the commutator 180, the brush arm 177 of which moves with the clutch member 157 as the unbalanced galvanometer causes rotary movement thereof. The contact terminals 179 of the commutator connect, by means of conductors 215 with a variable resistance 216, Figure 29, in the power circuit of a variable speed, 125 volt, D. C. motor 217, Figures 18, 29.

The arrangement is such that the motor is normally driven at its fastest speed when the material W is within the allowed tolerance of its desired gauge, and is driven at slower speeds in proportion to the deviation of the stock gauge from said desired thickness. The motor 217 is constantly driven while the apparatus is in operation.

The motor 217 and associated mechanisms are mounted in the cabinet constituting unit D. As is most clearly shown in Figures 18, 19, and 20, the motor 217 is supported in a bracket 220 that is mounted upon a panel 221, the shaft of the motor carrying a pinion 222 that is meshed with a gear 223 that is journaled on a stub shaft (not shown) mounted in the bracket 220. The hub of the gear 223 carries a cylindrical driving member 224 adapted frictionally to drive a disc 225 through the agency of an intervening idler roller 226, the latter being slidably journaled upon an angularly movable spindle 227. Means is provided for moving the idler roller 226 alternatively to either of two positions radially of the disc 225, whereby the latter is driven at a faster or slower speed, and means is provided for lifting the idler roller out of engagement with the driving member 224 and for concurrently applying a brake to the disc 225 to bring the latter to rest after having been driven.

For moving the idler drive roller 226 radially of the disc 225, said drive roller is engaged on opposite sides of its hub by the forked free end of a shipper lever 229, which end is bifurcated so as to straddle the spindle 227. The other end of the shipper lever 229 is pivotally mounted at 230 on the frame of a solenoid 231 that is mounted upon a bracket 232 on the panel 221, said shipper lever being connected to the core 233 of the solenoid so as to be operated where the solenoid is energized. A tension spring 234 is connected at one end to an intermediate point of the shipper lever, and at its other end is connected to a fixed point on the bracket 232, so as normally to hold the roller 226 near the outer periphery of the disc 225 when the solenoid is not energized.

The solenoid 231 is controlled by switch 171 which is closed when the material W is at proper gauge or within .0005" thereof, so that the shipper lever 229 is in the position shown in broken lines in Figure 18 when the work is of proper gauge. In this position of the idler roller the disc 225 is driven faster than when the said roller is in the position shown in full lines.

The spindle 227 that carries the friction idler roller 225 is supported at one end by a hub 237 that is mounted upon a rock shaft 238 that is suitably journaled in a bracket carried by the panel 221. Also adjustably clamped upon the rock shaft 238 is lever 240, the free end of which carries a brake shoe 241 adapted to engage the peripheral face of the disc 225. The rock shaft 238 is connected to the core 242 of a solenoid 243 in such a manner as to be rocked in the proper direction to lift the idler roller 225 out of driving engagement with driving member 224, as indicated in broken lines in Figure 20, and to apply the brake shoe 241 to the disc 225, whenever the solenoid 243 is energized. A tension spring 244 is connected to the solenoid core 242 and to an adjustable stud 245 for normally urging the said core 242 toward the position shown in Figure 18, in which position the disc 225 is driven. The solenoid 243 controls the duration of the driving of the disc 225, and the operation of the solenoid is controlled by a normally open switch presently to be described.

As is most clearly shown in Figure 20, the friction disc 225 is mounted upon the front end portion of a shaft 248 that is journaled in a suitable bracket 249 mounted upon the panel 221. The middle portion of the shaft 248 is formed with a worm 250 that is meshed with a worm gear 251 mounted upon an elongate bushing 252 that is journaled upon a stationary shaft or bar 253, the latter being mounted at its ends in opposite walls of the bracket 249, transversely of the shaft 248.

Also mounted upon the bushing are respective cams 255, 256, and 257 that are secured to each other and to the gear 251 by means of intervening spacer members 258 that are mounted on the bushing 252. The arrangement is such that the cams 255, 256, and 257 rotate in unison with the gear 251.

As is most clearly shown in Figures 20, 21, a stationary shaft or bar 259 is mounted in the bracket 249 somewhat above and parallel to the bar 253. Journaled upon one end portion of the bar 253 is a ratchet 260 that is integrally formed, laterally thereof, with a coaxial pinion 261 that is meshed with a gear 262 that is mounted upon the driven shaft 263 of a constantly driven electric clock motor 264, the latter also being mounted upon the bracket 249.

Figure 22:
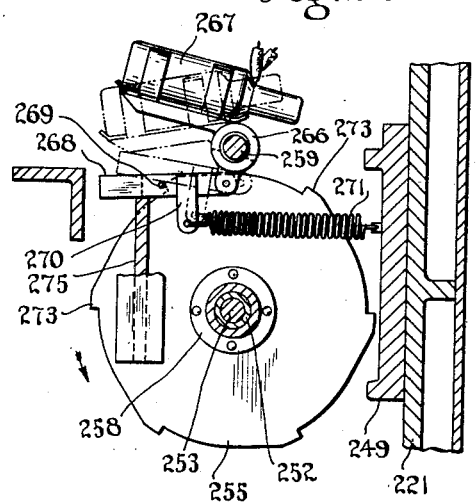
Figure 22 is a section on the line 22—22 of Figure 21.

The shaft 259 pivotally supports three mercury switch assemblies that are actuated by the respective cams 255, 256, and 257. As is best shown in Figure 22, the switch assembly actuated by cam 255 comprises a switch support 266 that is shaped like a bell crank and pivoted at its elbow on the shaft 259, one arm of said support being disposed substantially horizontally and carrying a normally closed mercury switch 267. The other arm of support 266 is forked and straddles the cam 255, and is pivotally connected to a U-shaped arm 268 that is provided with a transverse stud 269 that engages the perimeter of the cam 255. The arm 268 also is provided with a downwardly extending finger 270 that is connected by a tension spring 271 to a fixed point on the bracket 249, so that the stud 269 constantly is urged against the cam surface, and the switch urged toward the broken line position in said figure. The switch 267 controls the operation of solenoid 243, which controls the driving of disc 225. Thus the switch 267 controls the drive of cams 255, 256, and 257.

Cam 255 is formed with six equally spaced camming elevations 273, 273, each of which has an abrupt, radial, leading edge, a short peripheral dwell, and a sloping trailing edge. When the cam 255 is driven, which drive is in the direction indicated by the arrow, the cam elevations 273 in succession engage the stud 269 so as to move the arm 268 to the left as viewed in Figure 22, against the tension of spring 271, whereby the switch 267 is tilted to the full line position shown in said figure, and its contacts closed. This stops the movement of the cams 255, 256, and 257 by closing the circuit to the solenoid 243 whereby the latter is energized to lift the idler roller 226 out of engagement with drive member 224 and to apply the brake 241 to the disc 225.

It is during intervals when the cam 255 is rotating through one-sixth of a revolution that the calender control mechanism is operating to adjust the calender rolls, said adjustment being effected by means of switch mechanism presently to be described, which switch mechanism is operated by the cams 256, 257. It will be seen that the duration of the calender adjustment will vary according to the speed of rotation of the cam 255, which speed will be slower when the idler roller 226 is in the position shown in full lines in Figure 18, and faster when it is in the broken line position.

For moving the switch 267 to its open position whereby a calender adjustment is initiated, means is provided for lifting the stud 269 out of engagement with a cam elevation 273, thereby permitting the spring 271 to tilt the switch 267 to the broken line open position of Figure 22. Said means comprises a lift-bar 275 that abuts one side-wall of the bracket 249 and has an offset portion of its structure in engagement with the under side of the free end of the arm 268. The upper end of the lift-bar 275 is pivotally connected to an angular core 276 of a solenoid 277, said core being pivotally mounted at 278 on the frame of the solenoid. The arrangement is such that when the solenoid 277 is energized, the lift-rod 275 raises the arm 268 until the stud thereof clears the cam elevation 273, thereby permitting the spring 271 to operate to tilt the switch 267.

It will be seen that the time interval between calender adjustments depends upon the frequency at which the solenoid 277 is energized, and as hereinbefore stated, the frequency of calender adjustments is an exact multiple of the intervals of periodic thickness-gauging and recording.

The operation of the solenoid 277 is controlled by a normally open, intermittently operated mercury switch 280, Figures 11 and 17, that is mounted upon a supporting arm 281 that is pivotally mounted at one of its ends upon a stub shaft 282 extending from one side wall of the governor box 166. The free end of the supporting arm 281 is provided with a cam plate 283 that has its lower margin resting upon a rotatable cam 284, the latter being journaled upon a second stub shaft 285 extending from the sidewall of the governor box 166. Fixed to the cam 284 is a coaxial gear 286 that is driven through a train of reduction gears 287, 288 and 289, the latter gear being mounted upon the projecting end portion of the driven shaft 151. The speed reduction between the shaft 151 and the cam 284 provides the multiple of the gauging operations with relation to the calender adjusting operations. Although this multiple may be arbitrary, within certain limits depending upon a number of conditions, it preferably is not less than 8 to 1 since it is not desired to adjust the calender more than once during one revolution of the rolls thereof.

The cam 284 is formed on its perimeter with a re-entrant or recess 291 which receives the cam plate 283 of the arm 281 when the material W is off gauge and an adjustment of the calender is required. When the cam plate 283 moves into the recess 291, the arm 281 tilts downwardly toward its free end and thus tilts the normally open switch 280 to a position in which its contacts are closed, thus energizing the solenoid 277 with the result that the calender adjusting mechanism is set in motion. Said adjusting mechanism will perform a complete cycle of operations notwithstanding the fact that the switch 280 is closed but momentarily by the cam 284.

Adjustment of the calender is not necessary unless the work is over or under the desired gauge, so for this reason means is required for preventing the cam plate 283 from entering the cam recess 291 when these parts are in registry and the material W is of proper gauge. Said means comprises a solenoid 293, the angular core 294 of which is pivoted at 295 on the solenoid frame, and has connected thereto a downward extension 296 constituting a latch that is adapted to engage a lug 297 that projects forwardly from the cam plate 283. The solenoid is energized whenever the material W is over or under gauge, and thus withdraws the latch 296 from the lug 297. If during this interval the cam recess 291 moves under the cam plate 283, the switch 280 is tilted to closed position and a calender adjusting cycle is initiated. The solenoid 293 is controlled by an automatic switch presently to be described.

It is desirable that there be no interruption of the calender adjusting operation once it is set in motion, and to prevent such occurrence means is provided for completing a calender adjusting cycle which may be under way whenever the calender is stopped. Said means also serves to stop the control mechanism for the calender adjusting apparatus always in a determinate position, so that a definite interval must elapse after the calender is set in motion before a calender adjusting operation can be started.

Figure 16:
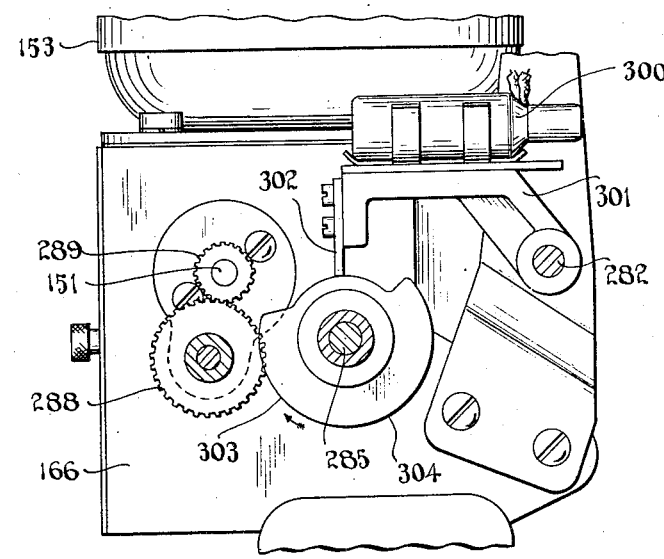
Figure 16 is a section on the line 16—16 of Figure 11.

To this end a mercury switch 300, see Figure 16, is mounted upon a supporting arm 301 also pivotally mounted at one end upon the stub shaft 282, the free end of said arm carrying a cam plate 302 that rests upon a rotatable cam 303 that rotates upon stub shaft 285. Cam 303 is positioned beside the gear 286, being fixed thereto so as to rotate in unison with cam 284. The cam 303 is formed for about three-fourths of its periphery with an elevated portion 304, which, when in engagement with cam plate 302, holds the arm 301 in upwardly tilted position so that the switch 300 is closed.

The remainder of the cam surface is of reduced height to support the switch 300 substantially in horizontal position, as is shown in Figure 16, in which position the switch is open.

The switch 300 is included in a shunt circuit that supplies power to the recorder motor 153 and to a reversing switch that controls calender adjusting motor 45, in such a manner as to deliver power to said members, upon occasion, when one or both switches 78 and 212 are open. The cam 303 is so angularly positioned with relation to cam 284 that the cam plate 302 drops onto the low portion of the cam 303, as is shown in Figure 16, to open switch 300, a brief interval before the cam plate 283 registers with recess 291 of cam 284, and drops thereinto if the material W is off gauge. If upon the opening of switch 300, either of the switches 78 or 212 controlling the power to motors 45 and 153 is open by reason of slowing or stopping of the calender, or the lifting of the gauging unit 60 from the calender roll, the motor 153 will come to rest, its momentum being sufficient to rotate shaft 151 a little farther so that the recess 291 of cam 284 will be beyond cam plate 283, as is shown in Figure 17. The cam 303 tilts the switch 300 to closed position immediately after cam plate 283 rises out of recess 291 in cam 284 so that a calender adjusting cycle initialed thereby will be carried to completion and the motor 153 stopped in determinate position notwithstanding the fact that one or both switches 78, 212 may be opened after the calender adjustment has started. Since the motor 153 always stops with the cam 284 in the position shown in Figure 17, it will be seen that no calender adjustment can be initiated the moment the apparatus is started, the cam 284 requiring to rotate nearly one revolution before such adjustment can start.

Figure 25:
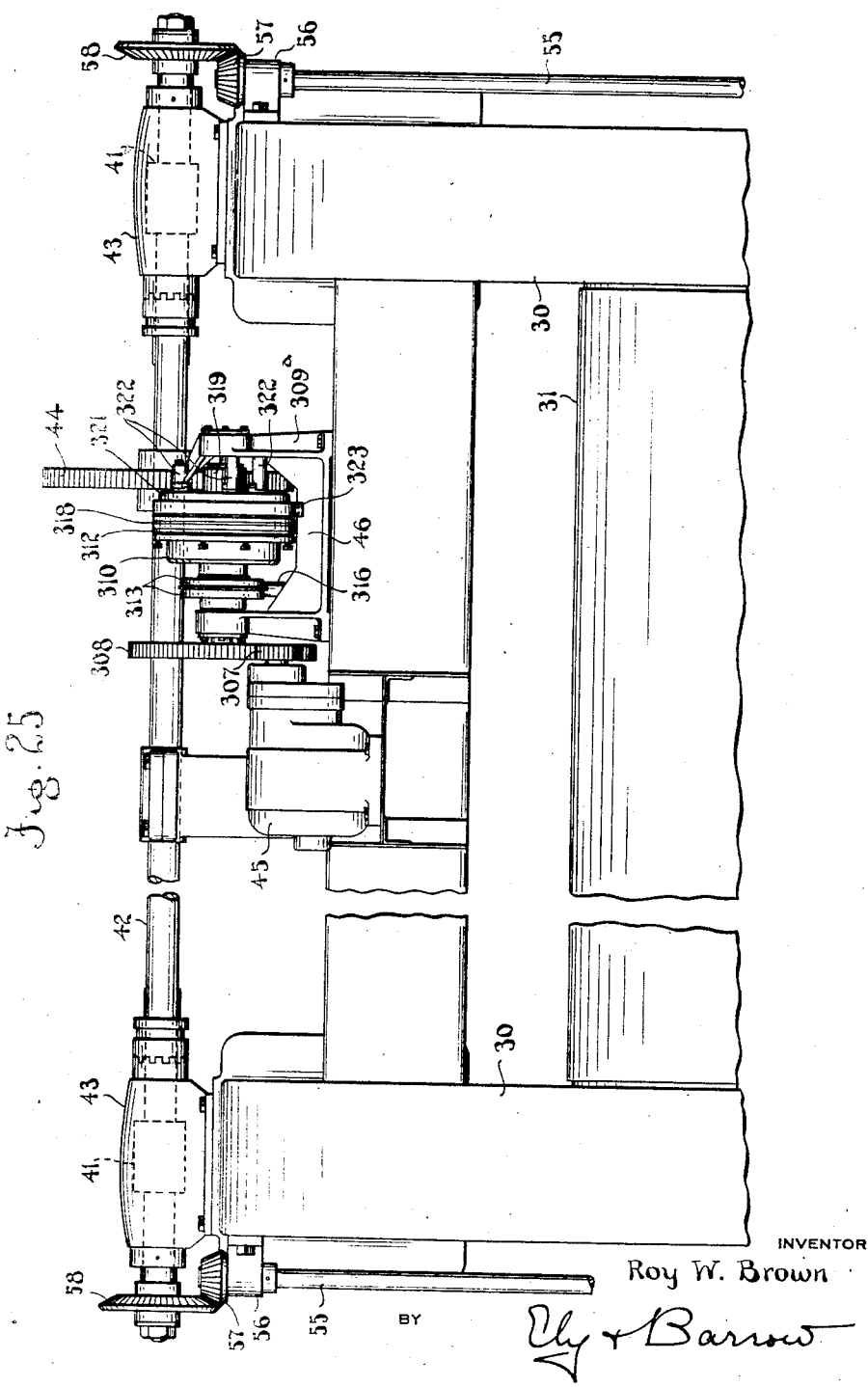
Figure 25 is a front elevation of the upper part of a calender, showing the clutch and brake associated with the calender control mechanism.
Figure 26:
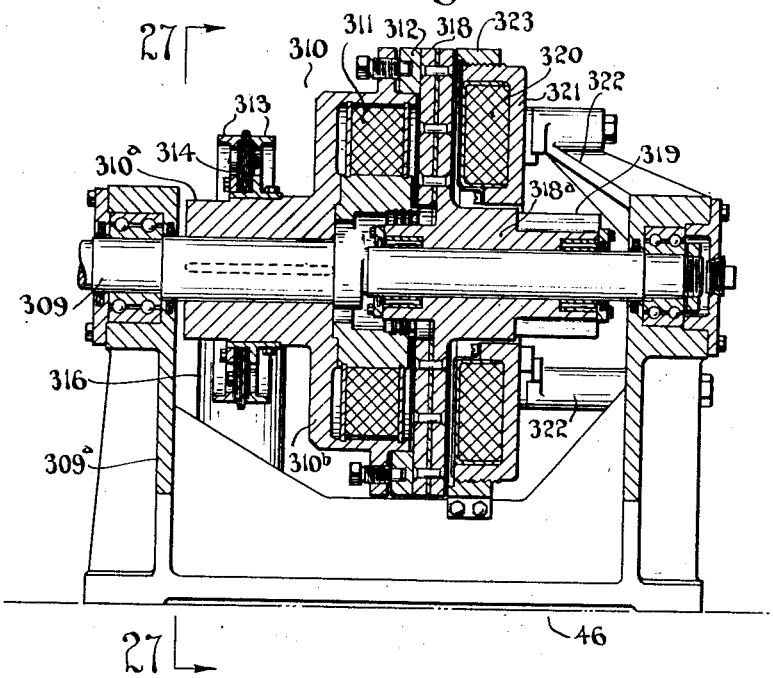
Figure 26 is a vertical section through the clutch and brake shown in Figure 25, parallel to the axis thereof.
Figure 27:
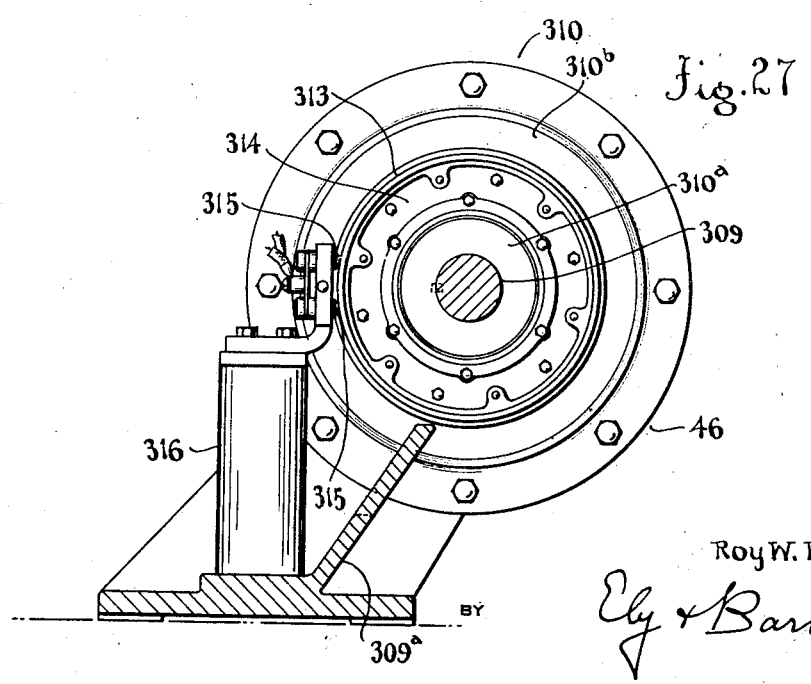
Figure 27 is a section on the line 27—27 of Figure 26.

The calendar control apparatus comprising the brake and clutch mechanism 46 will now be described, reference being directed especially to Figures 25, 26, and 27 of the drawings. The reversible motor 45 includes a train of enclosed reduction gears (not shown), which gears driving a pinion 307 that is meshed with a gear 308 that is mounted upon one end of the shaft 309 of the brake and clutch device 46, said shaft being journaled at its respective ends in a suitable journal bracket 309$^a$ mounted upon a cross member of the calender.

Keyed to the shaft 309, on the end portion thereof adjacent gear 308, is a clutch member 310 comprising a hub portion 310$^a$ and an enlarged housing portion 310$^b$. The latter has its front face circumferentially recessed to receive a magnetic clutch coil 311, and carries a concentric clutch band 312 of suitable frictional material on said front face, circumscribing the coil 311 and a little in front of the same. Operating current is delivered to the clutch coil 311 through a pair of contact rings 313, 313 that are carried on the clutch hub 310$^a$ by a support 314 of insulating material, the contact rings being engaged by respective contact brushes 315, 315 carried upon a post 316 that is mounted upon bracket 309$^a$, said brushes being connected to respective electrical conductors in the usual manner as shown in Figure 27.

Journaled upon the shaft 309, beside the clutch member 310 is a clutch disc 318 that is formed with an axial hub 318$^a$ upon which is formed a pinion 319, the latter meshing with gear 44 on the shaft 42. The clutch disc 318 has limited axial movement upon the shaft 309, and is constructed of magnetic material so as to be drawn by clutch coil 311 against the clutch band 312 when said coil 311 is energized.

On the opposite side of the clutch disc 318 from the clutch coil 311 is a magnetic brake coil 320 of larger capacity than clutch coil 311, said brake coil 320 being mounted in an annular metal shell 321 that is carried by arms 322 formed on bracket 309$^a$. The coil shell 321 also carries a circumferential brake band or shoe 323 against which the clutch disc 318 is drawn when the coil 320 is energized. The capacity of the brake coil 320 is such that the clutch disc 318 can be drawn quickly away from coil 311 into engagement with brake shoe 323 when clutch coil 311 is de-energized.

In the operation of the calender adjusting apparatus, there is normally a light current passing through clutch coil 311 sufficient to draw the clutch disc 318 lightly against clutch band 312. This is called "clutch drag". Thus whenever the work is off-gauge and the motor 45 driven, in either direction, the shaft 42 will be driven until lost motion or back-lash in the gears 40, 41, 49, 50, 53, 54, 57, 58, 44 and 319 and screws 39 and 48 is taken up. Then the clutch slips, the torque required to adjust the calender rolls being greater than the friction between clutch members 312, 318. This condition prevails until full line current is delivered to clutch coil 311, whereupon the clutch disc 318 is drawn strongly against clutch band 312 and shaft 42 is driven to effect the necessary calender adjustment. After a determinate interval the clutch coil 311 is de-energized and immediately the brake coil 320 is energized to draw the rotating clutch disc 318 away from the clutch band 312, into frictional engagement with brake band 323, which stops the rotation of the said clutch disc and the calender adjusting operation. The brake coil 320 is then deenergized, and a strong current momentarily is passed through clutch coil 311 to draw the clutch disc 318 into engagement with clutch band 312 against the residual magnetism in brake coil 320. Thereafter the normal light current passes through coil 311 to apply the clutch drag.

Usually a single adjusting operation brings the work back substantially to proper gauge so that the motor 45 stops rotating before the brake is released.

The clutch drag is controlled by a mercury switch 325, the brake is controlled by a mercury switch 326, and the clutch is controlled by a mercury switch 327. As is most clearly shown in Figure 24, the clutch drag switch 325 and the brake switch 326 are mounted upon an angular supporting plate 328 that is mounted upon a flexible U-shaped member 329 carried by one arm of a bell-crank 330 that is pivotally mounted at its elbow upon the bar 259. The other arm of the bellcrank 330 carries a pin 331 that rests upon the periphery of the cam 257, the latter being formed with six equally spaced elevations 333, 333 thereon. The elevations 333 have sloping leading edges and radial trailing edges with practically no dwell at the intersection of said edges. The supporting plate 328 is so shaped that one of the switches 325, 326 is open when the other is closed except for a brief interval during the tilting of said supporting plate. The flexible member 329 is easily bent to provide minor timing adjustments of the clutch drag and brake.

Figure 24:
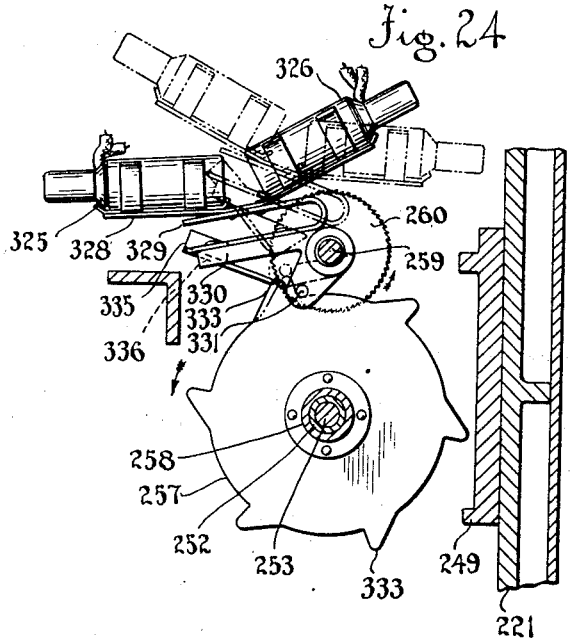
Figure 24 is a section on the line 24—24 of Figure 21.

Since the drive of cam 257 is controlled by cam 255, the angular position of cam 257 is so arranged that an elevation 333 thereon is tilting bellcrank 330 to open clutch drag switch 325 and close brake switch 326, as shown in broken lines in Figure 24, at the instant cam 255 is closing switch 267 to stop the rotation of cams 255, 256. and 257.

In order to provide a brief interval sufficient for the brake to bring the calender adjusting mechanism to a complete stop, means is provided for relatively slowly restoring the switches 325, 326 to their normal position shown in full lines in Figure 24.

To this end the bellcrank 330 is formed with a laterally-extending portion 335 (see Figures 18 and 21) that carries a spring pawl 336 that engages the constantly driven ratchet 260. The arrangement is such when a cam elevation 333 passes from under pin 331, the bellcrank 330, supported upon the pawl 336 by the ratchet 260, moves to normal position relatively slowly as the latter rotates, although the interval need not exceed a half-second in duration.

Figure 23:
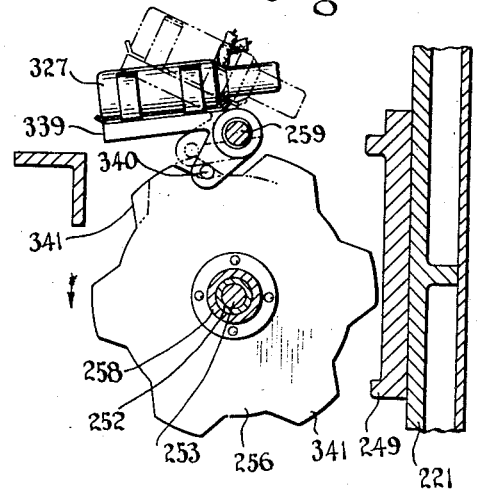
Figure 23 is a section on the line 23—23 of Figure 21.

The normally open switch 327, that controls the full line current to clutch coil 311, is mounted upon one arm of a bellcrank 339, the other arm of which is provided with a pin 340 that rests upon the periphery of the cam 256. The latter is formed with six equally spaced cam elevations 341, 341 having sloping leading and trailing edges and being of substantial length. Each elevation 341 is adapted to tilt the bellcrank 339 and switch 327 to the position shown in broken lines in Figure 23, to close said switch and thereby to deliver full line current to the clutch coil. With relation to cams 255 and 257, cam 256 is arranged so that switch 327 closes about the middle of a calender adjusting cycle, after the lost motion of the adjusting gears has been taken up by the clutch drag, and opens before the switch 326 has closed to energize the brake coil 320.

Attention is now directed to Figures 28 and 29 of the drawings wherein is shown wiring diagrams for the electrical apparatus that controls the calender adjusting mechanism. These circuits show the condition of the several mechanisms when the apparatus is in inoperative position. The circuit shown in Figure 28 comprises a 440 volt, 3 phase, alternating current power line 345, and the circuit shown in Figure 29 comprises a 125 volt, direct current power line 346. Across one side of main line 345 is a transformer 347, the secondary of which controls a two-pole relay 348 through a 110 volt circuit 349, the switch 78 being in said circuit. Across the other side of line 345 is a transformer 350 delivering 110 volt current through line 351.

A seven-pole master switch 353 is interposed in line 345 anterior to transformer 350, which switch also controls circuit 349 and a circuit 354 from the D. C. power line 346. Conductors 213 from centrifugal switch 212 are connected across one side of circuit 349 between transformer 347 and switch 353.

The reversible calender adjusting motor 45 is supplied with power from line 345 through a reversing switch 356 that is operated by a reversing coil 357, the latter also operating switch 358 in circuit 351. The reversing coil 357 is mounted across line 351 and receives current through a transfer switch 359 that is manually operated to connect the said reversing switch for automatic or manual operation. The transfer switch 359 is open when the apparatus is inoperative. It has a plurality of switch-contacts as will be evident from the fact that it appears at several places in the circuits shown in Figures 28 and 29 where it serves to adapt various instrumentalities for manual or automatic operation.

If the reversing coil 357 is to be manually operated, the opposite sides thereof are connected through respective conductors 360 to opposite poles of a manually operated switch 361 that is connected through line 362 to one side of line 351. Switch 361 is manually operated to actuate reversing coil 357 in either direction according as the work W is indicated to be over or under gauge.

When the apparatus is arranged for automatic operation, which is the usual method of operating, opposite sides of reversing coil 357 are connected to respective conductors 363 controlled by the respective switches 170, 172 that are connected to one side of line 351 through conductor 364. The latter is opened and closed by relay 348, the arrangement being such that current to motor 45 is cut off, through the opening of switch 356, when either mercury switch 78 or 212 is opened. The lights 173, 175 also are mounted across line 351 through the respective switches 170, 172 so as to be illuminated when said switches are closed. The conductor 364 extends across line 351 and includes rheostats 184, 185 which supply current to the galvanometer circuit hereinbefore described.

Conductors 366 connected to conductor 364 and to one side of line 351 respectively, supply current for recording motor 153. Conductors 367 connected to opposite sides of line 351 supply current to the chart-driving motor 134. Mercury switch 300 connects conductors 367 and 364 for the purpose of supplying current to the reversing switch coil 357 so as to complete a calender adjustment in case switches 78 or 212 are opened during such an adjusting operation.

Solenoid 243 is connected directly to one side of line 351, and is connected to the other side of line 351 through mercury switch 267 by means of conductor 369. Solenoid 277 that controls switch 267 is connected directly to one side of line 351, and is connected to the other side of said line through mercury switch 280 by means of conductor 370. Solenoid 293 that controls mercury switch 280 is connected directly to one side of line 351, and is connected to the other side of said line through conductor 371 in which is located switch 358, operated by reversing coil 357, and transfer switch 359. The latter is closed for automatic operation and open for manual operation of the apparatus. When said switch 359 is open, solenoids 293 and 277 are inoperative.

Solenoid 231 is connected to opposite sides of line 351 by conductors 373, 374 in the latter of which is switch 171 that is closed when the material W is within the desired limits of thickness. Lamp 174 is mounted across conductors 373, 374 so as to be illuminated when switch 171 is closed. Motor 264 also is mounted across line 351.

Referring now to Figure 29, motor 217 and the commutator 180 that controls the speed thereof are mounted across line 354. Brake coil 320 is mounted across line 354 by means of conductors 376 in one of which is mercury switch 326. From clutch coil 311 extend conductors 377, 377, one of which connects with one side of line 354, and the other connects with transfer switch 359 which is connected to conductor 378 in position for automatic operation and is connected to conductor 379 in position for manual operation.

There is a switch in conductor 378 that is controlled by relay 348 for releasing the clutch when mercury switches 78 or 212 are opened. Conductor 378 connects with the other side of line 354 through mercury switch 327, the latter controlling the supply of full line current to the clutch coil. Conductor 379 connects with line 354 through manually operated switch 380.

Clutch drag switch 325 is provided with a pair of conductor wires 382, one of which connects with one side of line 354, and the other of which connects through a current limit relay 383 with one pole of a switch 384 that is opened and closed by said relay 383. The other pole of said switch 384 is connected by conductor 385 with conductor 378, between switch 327 and relay 348. A resistor 386 connects the respective poles of switch 384.

In the operation of the apparatus, assuming that the calender is to be adjusted automatically, transfer switch 359 is thrown so as to close all circuits for automatic operation. Master switch 353 is then closed to supply electrical current to the recording and adjusting system. Next the gauging unit 60 is placed against a piece of material of known thickness laid against the calender roll 32. The measuring or thickness setting transformer 80 is now adjusted by turning the shaft 115 either by means of the dial 118 or by a key fitted to the squared end 116 of the said shaft, until the air gap in the core or magnetic circuit of the transformer is identical with the gap caused by the material between the core 62 of transformer 61 and the roll 32. Any change in thickness of material separating the gauging unit 60 from the calender roll will cause the galvanometer to deflect, with resulting movement of pen 164 indicating variation from the set position, the moving of gauging unit 60 into operative position closes mercury switch 78 mounted in said unit.

When it is desired to form the material W of a certain thickness, the shaft 115 is turned until the indicating finger 121 shows that thickness on the indicia on the dial 118. This operation has, of course, also adjusted the gap across the core of transformer 80. The rolls of the calender are now manually adjusted until the galvanometer is balanced, at which time the material will be of proper thickness. The calender is then set in motion to form the sheet material W, the latter being fed about rollers 196, 197 of unit B, whence it passes to a suitable wind-up reel (not shown). The arm 199 of the generator unit of the Selsyn device is then lowered so that the wheels 202 thereof rest upon the moving material W, with the result that the centrifugal switch 212 in the motor unit of the Selsyn device is rapidly rotated and its contacts closed. The apparatus now is in normal operative condition.

Variations in the thickness of material W, such as are caused by change in the plasticity of the material, or change in the temperature of the material, or jarring of the rolls closer together, etc., cause the core 62 of transformer 61 to be brought closer to or farther from the roll 32. This changes the current induced in the secondary of the transformer 61 which causes greater or less current to flow in thermocouple circuit 189 and galvanometer coil 140.

The motor 153 constantly drives the shaft 151 and motor 134 drives the chart 133, and if the galvanometer pointer is out of balance, the disc 157 will be turned, as hereinbefore described, which moves the core completing armature 97 of the transformer 80 so that the gaps across the respective transformers again are the same. Changing the position of armature 97 also changes the position of the recording pen 164 through the agency of the pulley 161 and cord 162. The chart 133 is graduated beneath the pen 164 to indicate and record the plus and minus deviations from the set thickness of the work. In this manner the pen 129 on one side of the chart records the set thickness and the pen 164 the deviations therefrom.

When the disc 157 is rotated by reason of the off-gauge condition of the material W, it also moves the cam plates 167, 168, and 169 with relation to switches 170, 171, and 172, and the commutator arm 177 is moved angularly with relation to commutator 180. As will be evident from Figure 15, switch 171 is normally closed and lamp 174 is lighted when the material W is within the tolerance of the set thickness. If the material runs .0005" thick the pulley 161 is turned angularly, counter-clockwise as viewed in Figure 15, so that cam plate 167 engages and closes switch 170 to light lamp 173. The pulley does not turn far enough, however, to move cam plate 168 out of engagement with switch 171, to dim white light 174 unless the thickness of the work is off-gauge at least .001". When the material W is thin or under gauge the pulley 161 is turned clockwise and cam 169 closes switch 172 in the same manner as described with relation to switch 170, to light lamp 175. Closing of switches 170, 172 also closes the circuit to reversing coil 357 which is operated in the proper manner to close reversing switch 356 and switch 358, with the result that the motor 45 is driven in the proper direction to effect a calender adjustment. Since clutch drag switch 325 is normally closed, driving of motor 45 will take up all lost motion in the calender adjusting gears, without affecting the setting of the calender rolls. The provision of lamps 173, 175 gives a visible indication of the condition of the work, and the lamps may be seen at a distance from the calender.

Commutator 180 controls the drive of variable speed motor 217 which drives the cams 255, 256, and 257 for controlling a calender adjustment. As will be seen from Figure 29, the motor 217 is continuously driven, at relatively fast speed when the material W is of proper thickness and at progressively slower speeds according to the extent of deviation therefrom.

When the commutator brush arm 177 is moved angularly as described, it moves the brush 178 onto different commutator contacts 180 and thus automatically controls the speed of said motor 217, which in turn drives the cylindrical driving member 224.

The closing of switch 358 as described actuates solenoid 293 which withdraws latch 296 from switch support 281 so that said support rests entirely upon cam 284. Due to reduction gearing the cam 284 makes but one revolution while gauging mechanism is making a determinate plurality of gauging operations. Withdrawal of latch 296 from support 281 allows the latter to rest on the periphery of rotating cam 284, and when recess 291 of the latter moves under cam plate 283 of said support, the latter is tilted and electrical contact is made in mercury switch 280. This closes electrical circuit through conductor 370 to solenoid 277. Actuation of the latter raises lift-bar 275 (Figure 22) to release arm 268 from cam 255, permitting tension spring 271 to tilt normally closed switch 267 to open position and thus to break the current through conductor 369 to solenoid 243.

The current normally passing through solenoid 243 holds idler drive roller 226 out of contact with driving member 224. Breaking of said current permits idler roller 226 to drop into driving engagement with driving member 224 whereby disc 225 is driven, and through the latter cams 255, 256, and 257 are driven. If at this time switch 171 is closed, indicating an off-gauge condition of the work of not over .0005", solenoid 231 will be energized and idler roller 226 will be laterally positioned near the axis of disc 225, so as to drive the same relatively fast. If switch 171 is open, indicating that the work is at least .001" off gauge, solenoid 231 will be de-energized and spring 234 will be holding idler roller 226 near the outer periphery of disc 225, as is shown in full lines in Figure 18, so that relatively slow speed is imparted to disc 225.

As cams 255, 256, and 257 rotate, cam 256 acts to close switch 327 whereby full line current is delivered to clutch coil 311, the clutch is firmly closed to prevent slippage, and the motor 45 drives the calender-adjusting gears to adjust, the calender rolls to proper spacing. After a determinate interval of calender adjustment, cam 256 opens to de-energize clutch coil 311, and cam 257 tilts switches 325, 326 to open the former and close the latter whereby the clutch drag is released and power applied through brake coil 320 to apply brake 323 to rotating clutch disc 318, and thus to stop rotation of shaft 42 of the calender adjusting mechanism. As the brake becomes fully effective, cam 255 tilts switch 267 to closed position, thus energizing solenoid 243 to lift idler roller 226, against the tension of spring 244, out of driving engagement with driving member 224, and applying brake shoe 241 to disc 225 to stop rotation of cams 255, 256, and 257. The latter have moved one-sixth of a revolution in the operations described. As cam 255 is closing switch 267, cam 257 is releasing switch support 330 of switches 325, 326, and pawl and ratchet members 336, 260 respectively are tilting switch support 330 back to normal position. As switch 325 is closed, full line current momentarily passes across the poles of switch 384, before the relay is energized to cut in resistor 386, whereby said full line current enters clutch coil 311 and draws clutch disc 318 away from brake band 323 against the residual magnetism in brake coil 320. This completes a cycle of operation of the calender adjusting mechanism.

The provision of switch 300 assures that power for holding reversing switch 356 closed during the entire period of a calender adjusting operation, and that cam 284 will stop with its recess 291 just pass switch-operating position so that another calender adjusting cycle cannot be initiated until the calender has operated a determinate interval, which interval is an exact multiple of the interval between stock-gauging operations.

The switch 300, by opening before recess 291 of cam 284 registers with cam plate 283 of switch 280, prevents operation of solenoid 293 if either switch 78 or 212 is open, since then there is no current through reversing coil 357 to close switch 358 which is in the circuit with said solenoid 293.

The feature of driving the disc 225 faster when the work is off gauge less than .0005", and driving it slower when the work is off gauge .001" partly controls the time required for the cams 255, 256, and 257 to make one-sixth of a revolution, and thus controls the duration of operation of clutch coil 311 which controls the operative driving of the calender adjusting gears. The variable speed motor 217 that drives disc 225, and having its speed varied according to the thickness of the work, also serves to control the speed of rotation of said cams. Thus is greater or less calender adjustment effected in proportion to the extent of the off-gauge condition of the work.

It will be seen that the invention provides fully automatic apparatus for gauging and recording the thickness of a continuous sheet of material, and for maintaining said sheet at the desired gauge and that the various advantages set out in the foregoing statement of objects are achieved. The calender adjusting mechanism is equipped for manual operation if desired, but the operation preferably is automatically performed since experience has proved that many more adjusting operations are thereby effected, and the work maintained at more nearly uniform thickness.

Modification may be resorted to without departing from the spirit of the invention or the scope of the appended claims, which are not limited wholly to the specific construction shown and described.

What is claimed is:

1. In apparatus of the character described, the combination of a calender for producing continuous sheet material, intermittently operating means for gauging the thickness of said sheet at separated regions longitudinally thereof, and means for adjusting the calender rolls to compensate for variations in the thickness of the sheet.

2. In apparatus of the character described, the combination of a calender for producing continuous sheet material, means for intermittently gauging the thickness of said sheet, and means for adjusting the calender to compensate for variations in the thickness of the sheet at determinate time intervals with relation to the gauging of the sheet.

3. A combination as defined in claim 2 in which the interval between calender adjusting operations is an exact multiple of the interval between sheet-gauging operations.

4. In apparatus of the character described, the combination of a calender for producing continuous sheet material, means for gauging the thickness of said sheet, means for adjusting the calender rolls to compensate for variations in the thickness of said sheet, and means for disconnecting said gauging means and said calender adjusting means when the calender stops or its speed falls below a determinate minimum.

5. In apparatus of the character described, the combination of a calender for producing continuous sheet material, means for gauging the thickness of said sheet, means for adjusting the calender rolls to compensate for variations in the thickness of said sheet, means for disconnecting said gauging means and said calender adjusting means if the calender stops or its speed falls below a determinate minimum while no calender adjustment is being made, and means for completing a calender adjustment if the calender slows down or stops while such an adjustment is being made.

6. In apparatus of the character described, the combination of a calender for producing continuous sheet material, means for adjusting the rolls thereof, control mechanism for said calender adjusting means, means for gauging the thickness of said sheet material controlling the calender adjusting control so as to effect a calender adjustment when the gauge of the sheet varies from a determinate thickness, means for disconnecting the gauging means and calender adjusting control when the calender stops or falls below a determinate speed, and means for restoring the gauging mechanism and calender adjusting control to determinate positions after they have been so disconnected.

7. In apparatus of the character described, the combination of a calender for producing continuous sheet material, means for intermittently gauging said sheet, and means for adjusting the rolls of said calender for varying time intervals depending upon the variation of the thickness of the sheet from a determinate desired thickness.

8. In apparatus of the character described, the combination of a calender for producing continuous sheet material, means for adjusting the rolls of said calender for altering the thickness of the calendered sheet, means for intermittently gauging said sheet to determine variations from a determinate thickness, and control means for said calender adjusting means adapted to translate off-gauge measurements of the sheet into variable time-intervals.

9. A combination as defined in claim 8 in which the calender adjusting control means comprises a variable speed motor.

10. A combination as defined in claim 8 in which the calender adjusting control means comprises a variable speed motor and a variable friction drive.

11. In apparatus of the character described, the combination of a calender for producing continuous sheet material, mechanical means for adjusting the rolls of said calender to adjust the thickness of said sheet, means for intermittently gauging the thickness of the sheet, and control means governed by the gauging means for causing the calender adjusting means to adjust the calender in proportion to the off-gauge condition of the sheet, said control means including means for compensating for lost motion in the calender adjusting means.

12. In apparatus for controlling the thickness of material, the combination of a calender for producing continuous sheet material, mechanical means for adjusting the rolls of the calender to alter the thickness of said sheet, and power means for operating said calender adjusting means for a definite time interval for effecting a determinate adjustment of the calender, including means for compensating for lost motion in the calender adjusting means before the latter begins adjustment of the calender rolls.

13. In apparatus for controlling the thickness of material, the combination of a calender for producing sheet material, mechanical means for adjusting the rolls of the calender to alter the thickness of said sheet, and means for delivering power to said calender adjusting means, said means initially delivering only sufficient power to take up the back-lash in the adjusting means, and thereafter delivering additional power for a determinate time interval to adjust the calender rolls.

14. In apparatus for controlling the thickness of material, the combination of a calender for producing continuous sheet material, mechanical means for adjusting the rolls of the calender to alter the thickness of said sheet, power driving means for operating said calender adjusting means, including a friction-operated driving connection, and means for varying the friction in said connection whereby the calender adjusting mechanism is driven to take up back-lash therein, then stops, and thereafter is driven for a definite time interval for adjusting the calender.

15. A combination as defined in claim 14 including brake means adapted to move the driven member of the friction-operated driving connection away from the driving member thereof into engagement with a stationary braking element.

16. In apparatus for controlling the thickness of material, the combination of a calender for producing continuous sheet material, mechanical means for adjusting the rolls of the calender to alter the thickness of said sheet, power driving means for said calender adjusting means, a magnetic clutch in said power driving means, and a magnetic brake in opposition to said magnetic clutch adapted to open said clutch and draw the driven element thereof against a stationary braking element.

17. A combination as defined in claim 16 in which the magnetic clutch is a friction clutch, including means for applying light and heavy electrical current to the magnetic clutch at determinate time intervals.

ROY W. BROWN.